United States Patent
Nammi et al.

(10) Patent No.: US 11,658,851 B2
(45) Date of Patent: *May 23, 2023

(54) EMPLOYING MODULATION LAYER MAPPING TO IMPROVE PERFORMANCE OF MIMO COMMUNICATION SYSTEMS

(71) Applicant: AT&T Intellectual Property I, L.P., Atlanta, GA (US)

(72) Inventors: SaiRamesh Nammi, Kista (SE); Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,271

(22) Filed: May 6, 2022

(65) Prior Publication Data
US 2022/0263692 A1 Aug. 18, 2022

Related U.S. Application Data

(63) Continuation of application No. 17/060,974, filed on Oct. 1, 2020, now Pat. No. 11,368,340, which is a (Continued)

(51) Int. Cl.
*H04L 25/03* (2006.01)
*H04B 7/0456* (2017.01)
(Continued)

(52) U.S. Cl.
CPC ..... *H04L 25/03929* (2013.01); *H04B 7/0482* (2013.01); *H04B 7/0486* (2013.01);
(Continued)

(58) Field of Classification Search
CPC ............. H04L 25/03929; H04L 1/0009; H04L 1/0003; H04L 1/0026; H04L 1/06;
(Continued)

(56) References Cited

U.S. PATENT DOCUMENTS 9,214,992 B2   12/2015   Sairamesh et al.
9,225,398 B2   12/2015   Jayakrishnan et al.
(Continued)

FOREIGN PATENT DOCUMENTS

JP   2013-009400 A   1/2013

OTHER PUBLICATIONS

Nammi, et al. "Design principles for four branch downlink MIMO for long term HSPA evolution." Communications (ICC), 2012 IEEE International Conference on. IEEE, 2012. Retrieved on May 16, 2017, 7 pages.
(Continued)

*Primary Examiner* — Wednel Cadeau
(74) *Attorney, Agent, or Firm* — Amin, Turocy & Watson, LLP

(57) ABSTRACT

The disclosed subject matter relates to employing modulation layer mapping to improve the performance of multiple-input and multiple-output (MIMO) communication systems. In one embodiment, a method comprises determining, by a device comprising a processor, codeword information in association with establishment of a wireless communication link with a network device of a wireless communication network, wherein the device and the network device are configured to communicate via the communication link using a MIMO communication scheme. The determining the codeword information comprises determining a code rate and determining a number of modulation indexes for the code rate based on signal-to-noise ratios respectively associated with channel layers included in the MIMO communication scheme. The method further comprises sending, by the device, the codeword information to the network device via a control channel of the wireless communication link.

20 Claims, 15 Drawing Sheets

Related U.S. Application Data continuation of application No. 15/586,994, filed on May 4, 2017, now Pat. No. 10,833,897.

(51) Int. Cl.
*H04L 1/06* (2006.01)
*H04B 7/06* (2006.01)
*H04L 1/00* (2006.01)
*H04L 25/02* (2006.01)

(52) U.S. Cl.
CPC .......... *H04B 7/063* (2013.01); *H04B 7/0626* (2013.01); *H04L 1/0003* (2013.01); *H04L 1/0009* (2013.01); *H04L 1/0026* (2013.01); *H04L 1/06* (2013.01); *H04L 25/0204* (2013.01)

(58) Field of Classification Search
CPC . H04L 25/0204; H04B 7/0482; H04B 7/0486; H04B 7/0626; H04B 7/063
USPC .......................................................... 375/260
See application file for complete search history.

(56) References Cited

U.S. PATENT DOCUMENTS

| | | | |
|---|---|---|---|
| 9,264,915 B2 | 2/2016 | Hanbyul et al. | |
| 9,287,950 B2 | 3/2016 | Hua et al. | |
| 9,325,397 B2 | 4/2016 | Anders et al. | |
| 9,385,792 B2 | 7/2016 | Seo et al. | |
| 9,461,720 B2 | 10/2016 | Sairamesh et al. | |
| 9,559,828 B2 | 1/2017 | Runhua et al. | |
| 9,590,765 B2 | 3/2017 | Zhouyue et al. | |
| 2010/0195594 A1 | 8/2010 | Seo et al. | |
| 2010/0239040 A1* | 9/2010 | Beluri | H04L 5/006 375/267 |
| 2012/0218882 A1 | 8/2012 | Ko et al. | |
| 2013/0195032 A1* | 8/2013 | Goransson | H04W 52/262 370/329 |
| 2014/0064392 A1* | 3/2014 | Jonsson | H04B 7/0486 375/267 |
| 2015/0098403 A1 | 4/2015 | Namir et al. | |
| 2016/0197662 A1 | 7/2016 | Qiang et al. | |

OTHER PUBLICATIONS

Non-Final Office Action received for U.S. Appl. No. 15/586,994 dated Sep. 18, 2018, 25 pages.
Final Office Action received for U.S. Appl. No. 15/586,994 dated Mar. 28, 2019, 21 pages.
Non-Final Office Action received for U.S. Appl. No. 15/586,994 dated Oct. 29, 2019, 25 pages.
Final Office Action received for U.S. Appl. No. 15/586,994 dated Mar. 9, 2020, 28 pages.
Non-Final Office Action received for U.S. Appl. No. 17/060,974 dated Aug. 13, 2021, 36 pages.

* cited by examiner

Codeword Dimensioning Mapping Requirements for a 4-Rank MIMO System

| Codewords | Layers | Mapping |
|---|---|---|
| 1 | 1 | The codeword is mapped to the single layer. |
| 1 | 2 | The codeword symbols are split (even/odd) between the two layers. Note that this option is only used when there are 4 antenna ports |
| 2 | 2 | Each codeword is mapped to its own layer. Both codewords must have the same length. |
| 2 | 3 | The first codeword is mapped to the first layer, while the second codeword is split (even/odd) between the other two layers. Note that the first codeword must be half the length of the second codeword, so that each layer carries the same number of symbols |
| 2 | 4 | The first codeword is split (even/odd) between the first two layers, while the second codeword is split between the second two layers. Both codewords must have the same length |

FIG. 6

Codeword Information ⟵ 1000

| Code Rate | Number of Modulations | Modulation Indexes | Modulation Index to Layer Mapping |
|---|---|---|---|
| CR1 | 2 | MI1, MI2 | MI1-L1, MI1-L2, MI2-L3, MI2-L4 |
| CR2 | 2 | MI1, M2 | MI1-L1, MI1-L3, MI2-L2, MI2-L4 |

US 11,658,851 B2

EMPLOYING MODULATION LAYER MAPPING TO IMPROVE PERFORMANCE OF MIMO COMMUNICATION SYSTEMS

RELATED APPLICATIONS

The subject patent application is a continuation of, and claims priority to each of, U.S. patent application Ser. No. 17/060,974 (now U.S. Pat. No. 11,368,340), filed Oct. 1, 2020, and entitled "EMPLOYING MODULATION LAYER MAPPING TO IMPROVE PERFORMANCE OF MIMO COMMUNICATION SYSTEMS," which is a continuation of U.S. patent application Ser. No. 15/586,994 (now U.S. Pat. No. 10,833,897), filed May 4, 2017, and entitled "EMPLOYING MODULATION LAYER MAPPING TO IMPROVE PERFORMANCE OF MIMO COMMUNICATION SYSTEMS," the entireties of which priority applications are hereby incorporated by reference herein.

TECHNICAL FIELD

The disclosed subject matter relates to employing modulation layer mapping to improve the performance of multiple-input and multiple-output (MIMO) communication systems.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Fifth generation (5G) wireless communication networks are currently being developed and expected to handle a very wide range of use cases and requirements, including among others mobile broadband (MBB) and machine type communications (MTCs). For mobile broadband, 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G is targeting much higher throughput with low latency and utilizing higher carrier frequencies and wider bandwidths, at the same time reducing energy consumption and costs.

While LTE can provide increased capacity using standard antenna techniques, widespread deployment and optimization of MIMO antenna techniques can have a multiplicative effect on LTE's data throughput. MIMO communication systems can significantly increase the data carrying capacity of wireless systems. For these reasons, MIMO is an integral part of Third (3G) and Fourth generation (4G) wireless systems. Fifth generation (5G) systems will also employ MIMO systems to meet the various demands of data centric applications. Further, the number of antennas at the transmitter and receiver side for 5G MIMO systems will be increased (e.g., up to hundreds of antennas at the transmitter and receiver side) to increase system capacity, a concept referred to as massive MIMO. For example, typically in a MIMO system with a number of transmit antennas ($N_t$) and receive antennas ($N_r$), the peak data rate multiplies with a factor of $N_t$ over single antenna systems in rich scattering environment. However, unique challenges exist in association capitalizing on the full capacity of higher rank (e.g., greater than 2) MIMO systems to provide the levels of service associated with forthcoming 5G standards.

BRIEF DESCRIPTION OF DRAWINGS

FIG. 6 provides a chart describing the codeword dimensioning mapping requirements for a four-rank capable MIMO system.

DETAILED DESCRIPTION

Figure 1:
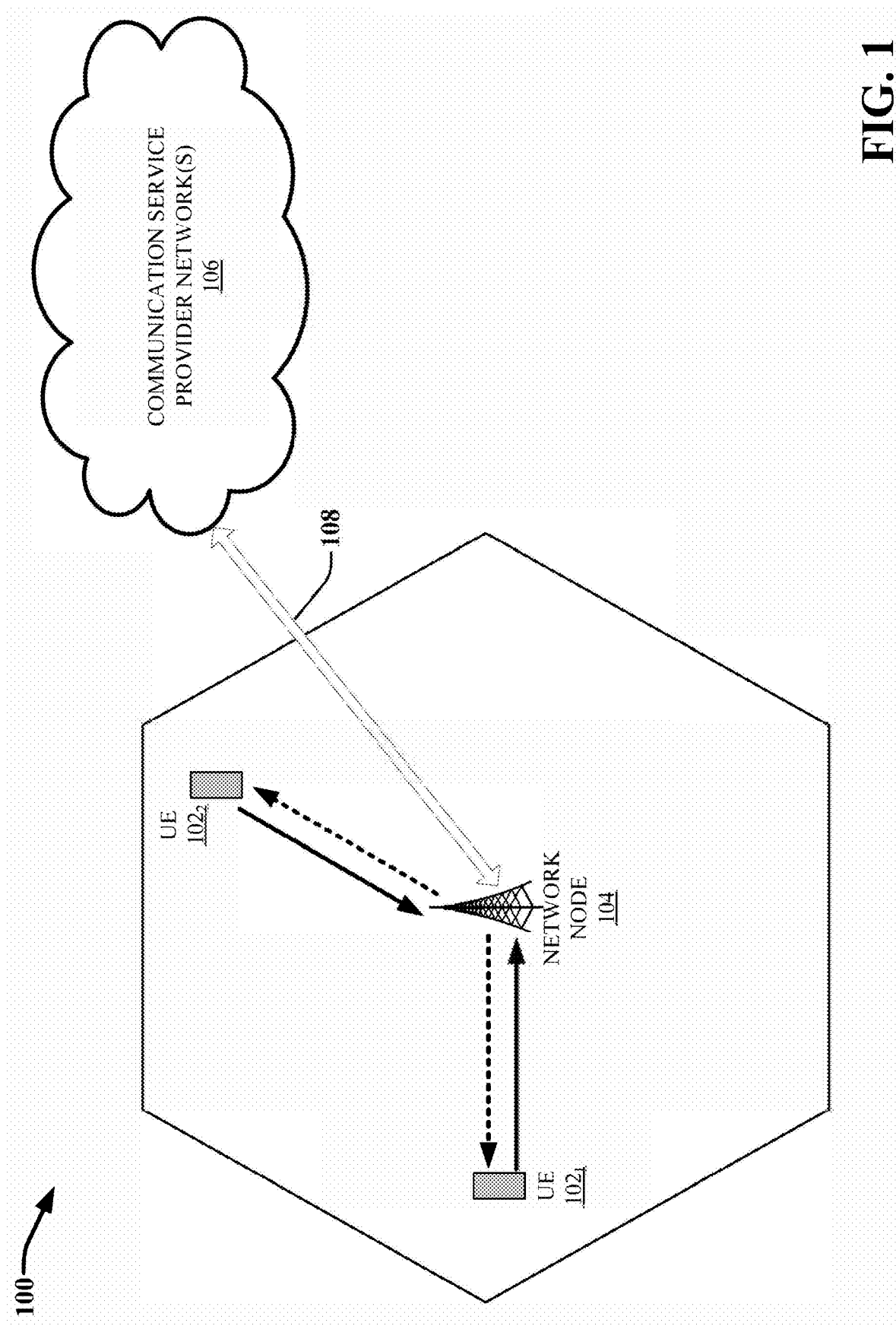
FIG. 1 is an illustration of an example wireless communication system that facilitates employing modulation layer mapping to improve the performance of MIMO communication systems in accordance with various aspects and embodiments of the subject disclosure.

The subject disclosure is directed to computer processing systems, computer-implemented methods, apparatus and/or computer program products that provide modulation layer mapping to improve the performance of MIMO communication systems. Spatial multiplexing is a transmission technique in MIMO wireless communication systems to transmit independent and separately encoded data signals, so-called streams, from each of the transmit antennas. In spatial multiplexing, the network node (e.g., an eNodeB) divides the data to be sent to a given user equipment (UE) on a given sub-channel into data streams, called layers. The number of layers is the same as the rank of the transmission. The transmission rank is determined according to channel conditions at the UE, as well as other considerations such as available resources at the network node. The maximum transmission rank of a MIMO communication system is equal to the number of transmit antennas ($N_t$) or the number of receive antennas ($N_r$) when the number of transmit antennas and the number of receive antennas is the same. Otherwise, the maximum rank is equal to the number of transmit antennas $N_t$ or the number receive antennas, whichever is less.

With multiple-layer transmissions, data arrives from higher level processes in one or more codewords. Each codeword is then mapped onto one or more layers. There are a number of processing steps involved in the generation of a codeword from a transport block (TB). These processing steps can involve encoding the TB with a defined code rate or TB size and a defined modulation or modulation index. As used herein, a codeword refers to a TB, data packet, data stream, information block, or the like, with a defined code rate and a defined modulation index. The terms code rate and TB size are used herein interchangeably. Multicodeword MIMO refers to a MIMO transmission scheme or protocol that involves the transmission of two or more codewords. Because each codeword can be mapped to a single layer, the maximum theoretical codeword capacity of a MIMO system is equal to the number of layers. For example, in a 4×4 MIMO system (e.g., meaning four transmit antennas at the eNodeB and four receive antennas at the UE), the maximum number of different codewords that can be transmitted is four (one on each layer).

In general, when channel conditions are favorable (e.g., meaning a high signal-to-noise (SNR) ratio and/or a signal-to-interference plus noise (SINR) ratio is observed), the greater the number of codewords transmitted, the greater the system performance, in terms of spectrum efficiency, capacity, throughput, etc. Thus, in the best case scenario, in order to achieve the highest system performance (e.g., the upper bound on the channel capacity), at high SNR and/or SINR channel conditions, the MIMO system should operate at full capacity with a different codeword assigned to each available layer. However, with conventional multicodeword MIMO, the feedback channel overhead in both the downlink and uplink control channels is proportional to the transmission rank. For example, if the UE reported transmission rank is equal to four, the receive antennas ($N_r$) need to report four channel quality indicators (CQIs). Similarly, the transmit antennas ($N_t$) need to inform the UE of four transport block sizes, four modulation indexes, four hybrid automatic repeat request (HARQ) process numbers, four redundancy versions etc. Hence, the feedback channel overhead is proportional to the transmission rank. Accordingly, with multicodeword capable MIMO systems (e.g., meaning any MIMO system with a transmission rank of two or greater), there is a trade-off between system performance achieved through maximizing the number of codewords transmitted and reducing overhead cost.

In current LTE multicodeword capable MIMO systems, codeword dimensioning has been employed to reduce the overhead cost associated with the uplink and downlink feedback. With codeword dimensioning, the available channel layers are bundled to support a maximum two codewords. In this regard, up to two TBs can be transmitted per transmission time interval (TTI), where each TB corresponds to one codeword. Each codeword is separately coded using turbo coding and the coded bits from each codeword are scrambled separately. The complex-valued modulation symbols for each of the codewords to be transmitted are mapped onto one or multiple layers. Note that the main principle behind the LTE codeword dimensioning is that whenever the transmission rank is more than two, the transport block size is increased to accommodate a greater number of bits.

With codeword dimensioning, although a MIMO system may support more than two layers, the number of transport blocks and corresponding codewords is still limited to two. As a result, the uplink and downlink feedback can be reduced to include only the information necessary to support one or two codewords. For example, in the case of a 4×4 MIMO transmission scheme, when two codewords are used as opposed to four, the feedback overhead can be reduced 50%. Likewise, when one codeword is used as opposed to four, the feedback overhead can be reduced 75%. However, the problem with codeword dimensioning however is that by using one or two codewords, although the feedback signaling overhead is reduced, the link throughput is impacted as MIMO layers with different channel qualities are coupled as codeword. For example, consider a scenario where a single codeword is used in association with a MIMO transmission protocol rank of eight and thus eight corresponding layers. In accordance with a one codeword maximum codeword dimensioning protocol, the UE is configured report the channel quality corresponding to the layer which has the lowest SNR. Hence even if the other seven channel layers have high SNRs, the feedback requirements applied by the one codeword maximum codeword dimensioning protocol prevents the network node from scheduling codewords with higher modulation indexes and code rates (or transport block sizes) to the corresponding higher SNR channel layers. This results in significant loss of link throughput, especially as the number of available channel layers increases in higher rank MIMO systems. Thus, when MIMO codeword dimensioning is applied, system performance is degraded at the cost of reduced overhead.

The subject disclosure provide an alternative and improved solution to codeword dimensioning that provides the link throughput gains attributed to usage of additional codewords relative to the maximum two codewords allowed with codeword dimensioning, while at the same time reducing the signaling feedback overhead traditionally associated with an increasing the number of codewords. This alternative and improved solution is referred to herein as modulation layer mapping. The main principle behind modulation layer mapping is that instead of using one modulation per each codeword, the modulation within a codeword can be different for each channel layer or for groups or subsets of channel layers. For example, with respect to a 4×4 MIMO system that uses a single codeword defined by a single code rate (or TB size) and modulation index, the codeword can be defined by a single code rate (or TB size) and two or more modulation indexes. In this regard, each distinct code rate/modulation index pair can be considered separate codewords. Further, each distinct code rate/modulation index pair can be determined based on the particular SNR associated with each different channel layer to which it is applied.

For example, in accordance with the disclosed modulation layer mapping techniques, a codeword can have one code rate, (e.g., such as code rate 1 (CR1)) and two modulation indexes (e.g., such modulation index 1 (MI1) and modulation index 2 (MI2)). In this regard, the codeword can be considered two codewords (or two sub-codewords), wherein one codeword (or sub-codeword) corresponds to CR1-MI1 and another corresponds to CR1-MI2. According to this example, for a MIMO system having a plurality of layers (e.g., layer 1, layer 2, layer 3 and layer 4), one codeword or sub-codeword (e.g., CR1-MI1) can be mapped to a first subset of the layers (e.g., layers 1 and 2), and another codeword or sub-codeword can be mapped to a second subset of the layers (e.g., layers 3 and 4). Thus, the modulation index for a codeword (or sub-codeword) that is mapped to a particular layer can be tailored to account for the SNR associated with that layer. In this way, the codeword dimensioning requirement for mapping of a single MIMO codeword to the lowest channel SNR can be eliminated, thereby improving the CQI value feedback by UE to the network node.

In accordance with various embodiments, the network node can be configured to determine the particular codeword configuration and layer mapping for downlink transmissions based on a feedback recommendation provided by the UE to the network node. In this regard, the codeword configuration refers the specific codeword or codewords employed (e.g., distinct code rate/modulation index pairs) and the layer mapping refers to the assignment of the respective codewords to the respective channel layers. This feedback recommendation is represented herein by codeword information that is determined by the UE based on channel state information (CSI) that is also determined by the UE. In one or more embodiments, the codeword information can be provided by the UE to the network node in the uplink control channel along with the CSI. The codeword information can include one or more recommended code rates. For each code rate, the codeword information can further include the number of modulation indexes determined for the code rate (which can be one or more), the actual modulation index or modulation indexes (e.g., when two or more modulation indexes are determined), and the layer or group of layers the modulation index applies or the respective modulation indexes apply (e.g., when two or more modulation indexes are determined). By doing this, the layer mapping where the modulation indexes are mapped can be adapted based on channel conditions and the feedback signal overhead scales accordingly.

The network node 104 can further evaluate the codeword information, the CSI information, and other network condition information (e.g., CSI determined at the transmitter side, available network resources, network side scheduling constraints, etc.) to determine and apply optimized codeword scheduling parameters for the downlink data communications. For example, the network node can schedule a UE with a first codeword represented by a first code rate and a first modulation index and on a first subset of the channel layers corresponding to the first code rate/first modulation index and further schedule the UE with a second code word represented by the first code rate and a second modulation index and on a second subset of the channel layers corresponding to the first code rate/second modulation index. As a result, each of the modulation indexes for a single code rate can be tailored to a specific SNR associated with the particular channel layer to which it is mapped.

In one embodiment, a device is provided that comprises a processor and a memory that stores executable instructions that, when executed by the processor, facilitate performance of operations, comprising. These operations can comprise determining codeword information in association with an establishment of a wireless communication link with a network device of a wireless communication network, wherein the device and the network device are configured to communicate via the communication link using a MIMO communication protocol. The determining the codeword information comprises determining a code rate, determining modulation indexes for the code rate based on channel state information for channel layers included in the MIMO communication protocol, and determining mapping information for the code rate that maps the modulation indexes to respective channel layers of the channel layers. The operations further comprise sending the codeword information to the network device via a control channel of the wireless communication link. In various implementations, the operations can further comprise, based on the sending the codeword information, receiving data transmitted to the device by the network device in accordance with a scheduling configuration determined based on the codeword information.

In another embodiment, a method is provided that can comprise determining, by a device comprising a processor, codeword information in association with establishment of a wireless communication link with a network device of a wireless communication network, wherein the device and the network device are configured to communicate via the communication link using a MIMO communication scheme. The determining the codeword information comprises determining a code rate and determining a number of modulation indexes for the code rate based on signal-to-noise ratios respectively associated with channel layers included in the MIMO communication scheme. The method further comprises sending, by the device, the codeword information to the network device via a control channel of the wireless communication link. In some implementations, the method further comprises, based on the sending the codeword information, receiving, by the device, data transmitted to the device by the network device in accordance with a scheduling configuration determined based on the codeword information. In various implementations, the determining the number of modulation indexes comprises determining modulation indexes for the code rate, and wherein the determining the codeword information further comprises determining mapping information that maps respective modulation indexes of the modulation indexes to different layers of the channel layers based on the signal-to-noise ratios respectively associated with channel layers.

In yet another embodiment, another method is provided that comprises receiving, by a network device comprising a processor, codeword information from a device associated with a wireless communication link established between the network device and the device, wherein the device and the network device communicate via the communication link using a MIMO communication standard, and wherein the codeword information identifies, code rates, modulation indexes for each code rate of the code rates, and respective channel layers included in the MIMO communication standard assigned to the modulation indexes. The method further comprises scheduling, by the network device, data transmissions sent from the network device to the device based on scheduling parameters determined based on the codeword information. In some implementations, the codeword information is received via a control channel associated with the wireless communication link in association with reception of channel state information provided by the device to the network device via the control channel. Further, in some implementations, the method further comprises determining, by the network device, the scheduling parameters based on the codeword information and the channel state information.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. Further, although the various modulation layer mapping techniques are described in association with downlink MIMO systems, it should be appreciated that the same principles are applicable for to uplink MIMO systems and side link MIMO systems.

FIG. 1 is an illustration of an example wireless communication system 100 that facilitates employing modulation layer mapping to improve the performance of MIMO communication systems in accordance with various aspects and embodiments of the subject disclosure. System 100 can comprise one or more user equipment UEs 102, wherein the respective UEs can include two or more antennas (not shown) thereby supporting MIMO communications. The number of antennas provide on a UE 102 can vary (e.g., from two to hundreds or more to accommodate massive MIMO systems). In various embodiments, system 100 is or includes a wireless communication network serviced by one or more wireless communication network providers. In the embodiment shown, a UE 102 can be communicatively coupled to the wireless communication network via a network node 104. Thus, in various embodiments, the UE can include any type of wireless device that communicates with a radio network node 104 in a cellular or mobile communication system. Examples of the UE 102 can include but are not limited to, a target device, a device to device (D2D) UE, a machine type UE or UE capable of machine to machine (M2M) communication, a personal digital assistant (PDA), a tablet, a mobile terminal, a phone, a smart phone, laptop embedded equipped (LEE), a laptop mounted equipment (LME), USB dongles, a wearable device, a virtual reality (VR) device, a heads-up display (HUD) device, a smart car, and the like.

The non-limiting term network node (or radio network node) is used herein to refer to any type of network node serving a UE 102 and/or connected to other network node, network element, or another network node from which the UE 102 can receive a radio signal. In accordance with the subject disclosure, the network node 104 can include any suitable device configured with two or more antennas to support various MIMO and/or massive MIMO communications. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like. In the embodiment shown, the UE 102 can send and/or receive communication data via a wireless link to the network node 104. The dashed arrow lines from the network node 104 to the UE 102 represent downlink communications and the solid arrow lines from the UE 102 to the network nodes 104 represents and uplink communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular technologies to facilitate wireless radio communications between devices (e.g., the UE 102 and the network node 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. In accordance with the subject disclosure, system 100 and the devices (e.g., UE 102 and network node 104) can be configured to perform MIMO communication schemes, and more particularly, MIMO communication schemes that involve the subject modulation layer mapping protocol. In various embodiments, system 100 can be configured to provide and employ 5G wireless networking features and functionalities.

Figure 2:
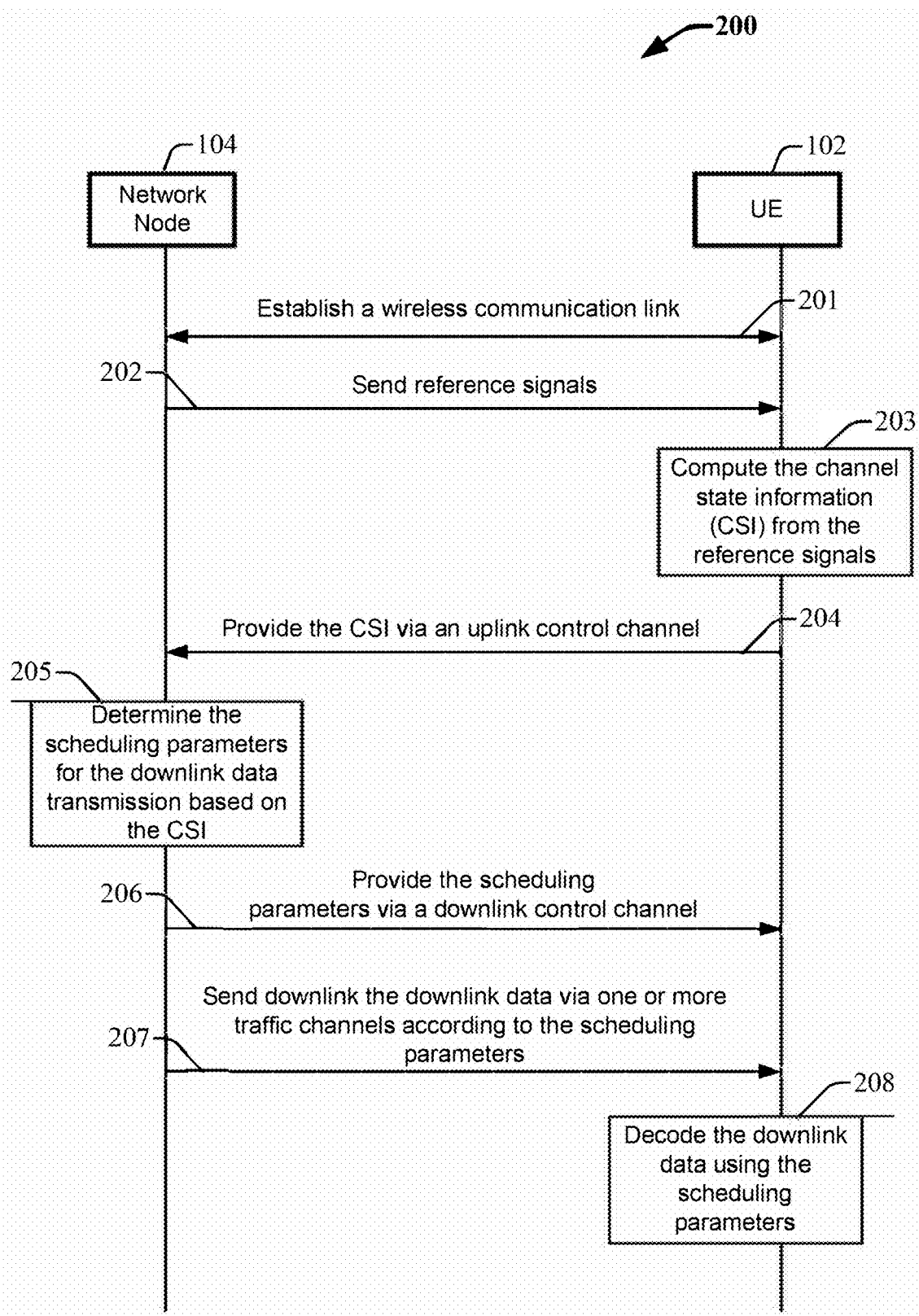
FIG. 2 presents a signaling diagram illustrating the conventional messaging sequence for downlink data transfer in 5G systems.

FIG. 2 presents a signaling diagram illustrating the conventional messaging sequence 200 for downlink data transfer in 5G communication systems. At 201, the UE 102 and the network node 104 can establish a wireless communication link using a suitable attachment procedure in accordance with the wireless communication standard employed by the UE (e.g., 5G). At 202, the network node 104 sends the UE reference signals. For example, these downlink reference or pilot signals can be cell specific or UE specific. In particular, the downlink reference signals can include predefined signals occupying specific resource elements within the downlink time-frequency grid. There are several types of downlink reference signals that are transmitted in different ways and used for different purposes by the receiving terminal (e.g., the UE). For example, CSI reference signals (CSI-RS) are specifically intended to be used by terminals to acquire channel-state information (CSI) and beam specific information (beam RSRP). In 5G CSI-RS is UE specific so it can have a significantly lower time/frequency density. Demodulation reference signals (DM-RS), also sometimes referred to as UE-specific reference signals, are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

From the reference signals, at 203, the UE can compute the channel estimates and then computes the parameters needed for CSI reporting. The CSI report consists of for example channel quality indicator (CQI) information, precoding matrix index (PMI) information, rank information (RI), CSI-RS Resource Indicator (CRI the same as beam indicator), and the like. For example, in wireless communications, channel state information (CSI) refers to known channel properties of a communication link. This information describes how a signal propagates from the transmitter to the receiver and represents the combined effect of, for example, scattering, fading, and power decay with distance. The method is called channel estimation. The CSI makes it possible to adapt transmissions to current channel conditions, which is crucial for achieving reliable communication with high data rates in MIMO systems. CSI needs to be estimated at the receiving device (i.e., the UE 102) and quantized and fed back to the transmitting device (e.g., the network node 104), although reverse-link estimation is possible in TDD systems. Therefore, the transmitter and receiver can have different CSI. The CSI at the transmitter and the CSI at the receiver are sometimes referred to as CSIT and CSIR, respectively.

At 204, the UE 102 sends the CSI report to the network node 104 via a feedback channel, (also referred to herein as an uplink control channel) either in response to request from the network node 104, or periodically in implementations in which the UE is configured to report CSI periodically. At 205, the network node scheduler uses this CSI information in choosing the downlink scheduling parameters for this particular UE 102. At 206, the network node 104 sends the scheduling parameters to the UE 102 via a downlink control channel. For example, the downlink control channel, also referred to as the physical downlink control channel (PDCCH), is a physical channel that carries the scheduling parameters, also referred to as downlink control information (DCI). For example, these downlink scheduling parameters can include the assigned mobile switching center (MSC), power usage requirements, physical resource block (PRB) assignments, and the like. With respect to MIMO communication schemes, the scheduling parameters can also include the number of MIMO channel layers scheduled, the codewords scheduled for the respective channel layers (e.g., including the code rates (or transport block sizes) and the modulation index for each codeword), parameters related to HARQ, sub-band locations and also PMI corresponding to the respective sub-bands. However, all DCI formats may not transmit all the DCI information noted above. In general, the contents of the PDCCH can depend on the transmission mode and DCI format.

Once the UE has received the downlink scheduling parameters via the PDCCH, at 207, the network node 104 can begin sending the downlink data to the UE via one or more traffic channels (e.g., the one or more MIMO channel layers) according to the scheduling parameters. At 208, the can receive and decode the downlink data using the scheduling parameters.

Figure 3:
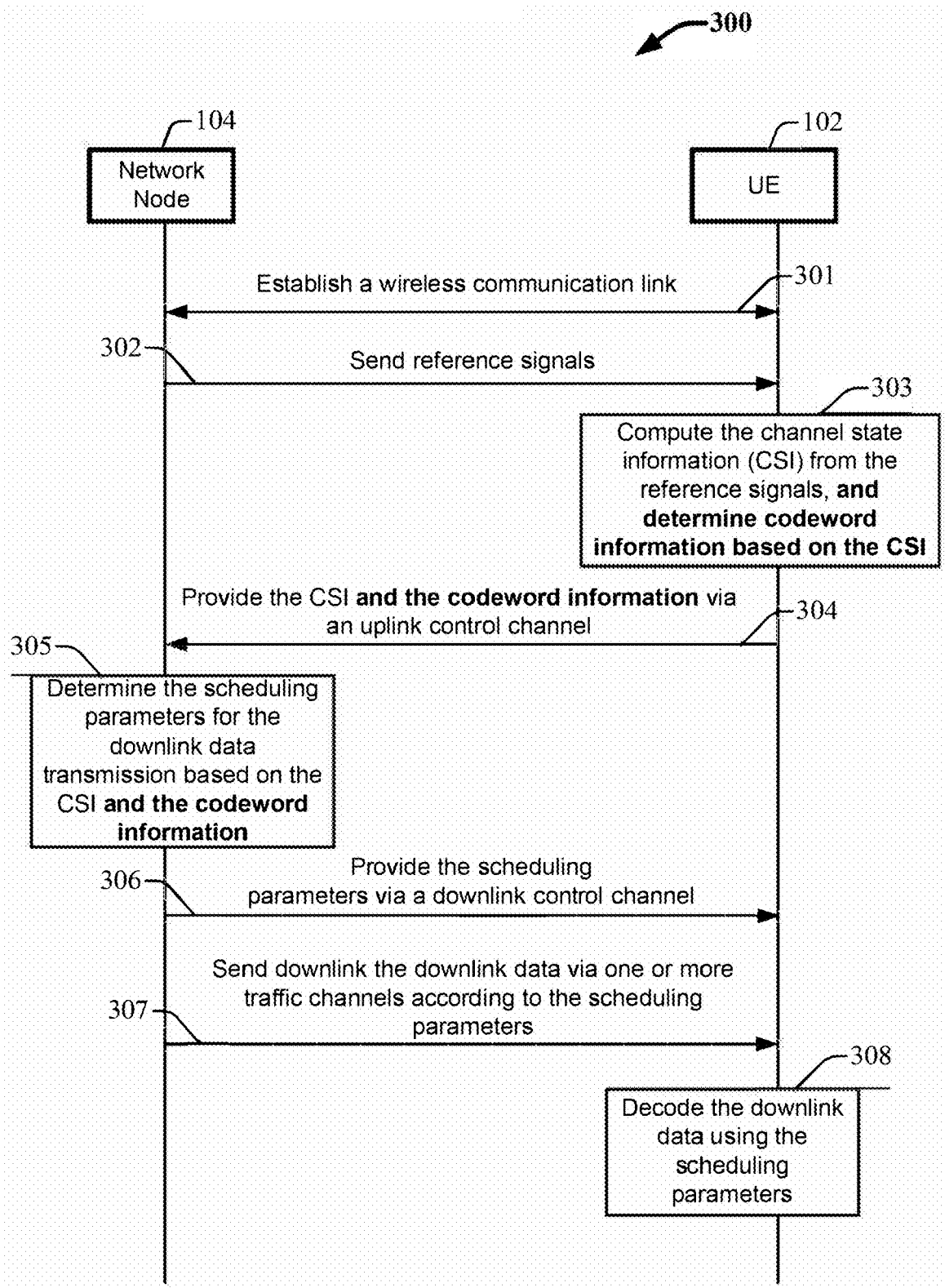
FIG. 3 presents another signaling diagram illustrating the messaging sequence for downlink data transfer in 5G systems employing modulation layer mapping in accordance with various aspects and embodiments of the subject disclosure.

FIG. 3 presents another signaling diagram illustrating the messaging sequence 300 for downlink data transfer in 5G systems employing modulation layer mapping in accordance with various aspects and embodiments of the subject disclosure. Repetitive description of like elements employed in respective embodiments is omitted for sake of brevity.

In the embodiment shown, the messaging sequence 300 for downlink data transfer in 5G systems employing modulation layer mapping is the same or substantially the same as the conventional messaging sequence 200. For example, messaging sequence 300 can include processing steps 301-308 which are respectively the same or substantially similar to the corresponding processing steps 201-208 with the following notable differences. At 303, in addition to computing the CSI from the reference signals, in accordance with modulation layer mapping, the UE 102 can further be configured to determine codeword information based on the UE determined CSI. As described infra with reference to FIGS. 9 and 10, this codeword information can include one or more recommended code rates (or TB sizes). For each code rate, the codeword information can further include the number of modulation indexes determined for the code rate (which can be one or more), the actual modulation index or modulation indexes (e.g., when two or more modulation indexes are determined), and the layer or group of layers the modulation index applies or the respective modulation indexes apply (e.g., when two or more modulation indexes are determined). At 304, in addition to sending the network node 104 the CSI information via the uplink control channel, the UE can also (or alternatively) send the codeword information. For example, the UE can include the codeword information in the CSI report that is sent to the network node 104.

Further, at 305, the network node 104 can employ the codeword information provided by the UE in addition to the CSI information to determine the downlink transmission scheduling parameters. For example, in some implementations, the network node 104 can apply the same codeword configuration (e.g., code rate/modulation index) and layer mappings recommended by the UE as provided in the codeword information. In other implementations, the UE can provide several (e.g., two or more) different codeword configuration and layer mapping options and the network node 104 can determine and apply one or more of the UE recommended codeword configurations and layer mappings that is most appropriate based on the channel conditions and/or various other applicable factors (e.g., transmitter side CSIT, available network resources, network side scheduling constraints, etc.). In yet another implementation, the network node 104 can modify a UE recommended codeword configuration and layer mapping based on the channel conditions and/or various other applicable factors (e.g., network resources, network side scheduling constraints, etc.) to determine optimal scheduling parameters including optimal codeword configuration and modulation index layer mapping.

Figure 4:
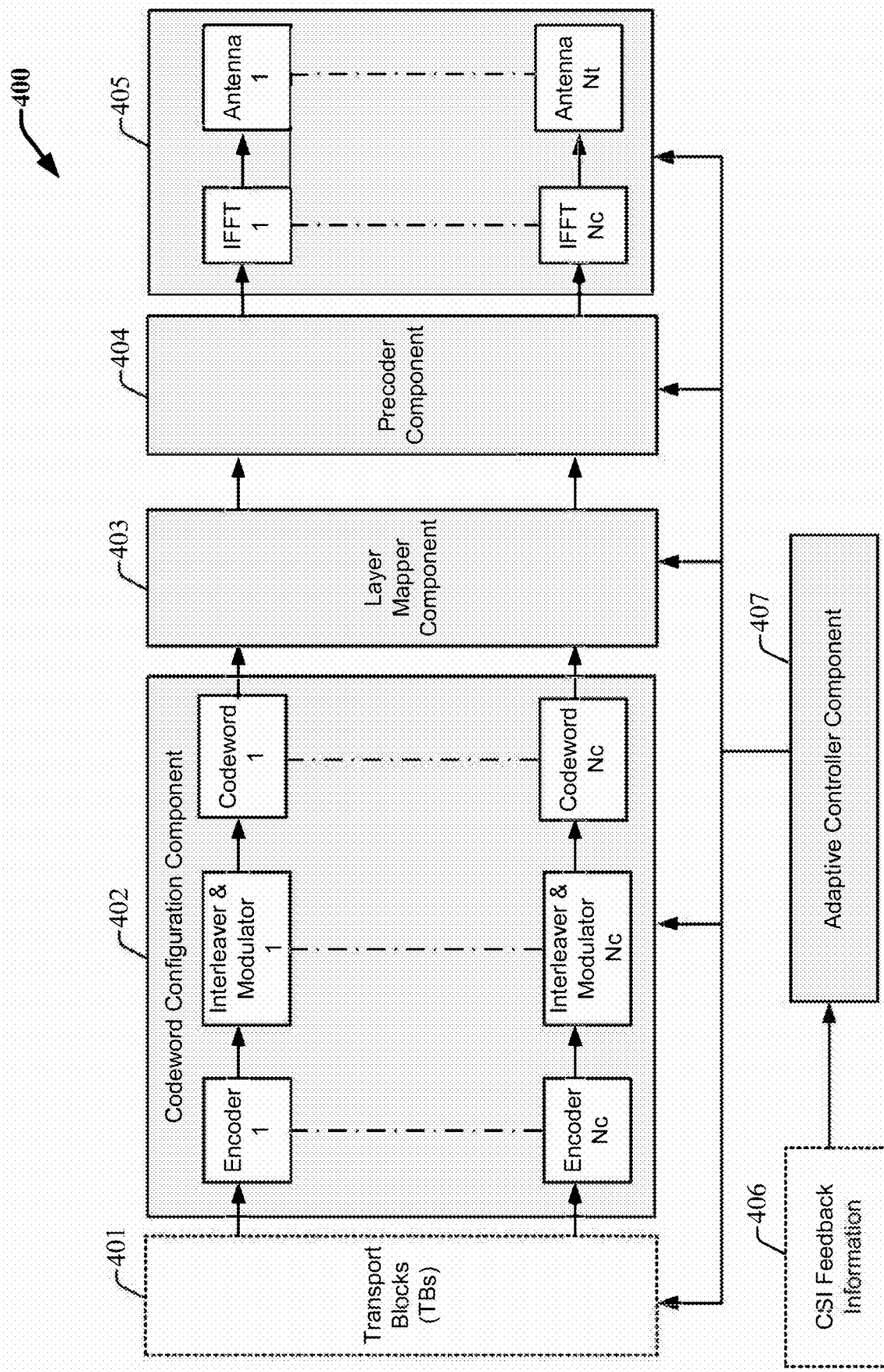
FIG. 4 presents a block diagram illustrating the transmission side of a MIMO communication system with $N_t$ transmit antennas in accordance with various aspects and embodiments of the subject disclosure.

FIG. 4 presents a block diagram illustrating the transmission side components/operations 400 of a MIMO communication system with $N_t$ transmit antennas in accordance with various aspects and embodiments of the subject disclosure. In various embodiments the components/operations 400 are provided and/or performed by the network node 104. There are $N_c$ transport blocks, where $N_c \leq N_t$. In the embodiment shown, the TBs 401 are passed to a codeword configuration component 402 that performs encoding, interleaver and modulator operations to generate codewords for the respective TBs. For example, the encoder adds parity bits to protect the data. Then the stream is passed through an interleaver. The interleaver size can be adaptively controlled by puncturing to increase the data rate. The adaptation is done by the adaptive controller component 407 using the CSI feedback information 406 provided by the UE in the uplink control channel. The interleaved data is passed through a modulator (e.g., a symbol mapper). The modulator can also be adaptively controlled by the adaptive controller component 407 based on the CSI information. The resulting information block generated based on the encoding, interleaver, and modulator operations consists of a codeword including a defined code rate and modulation index. In some implementations, cyclic redundancy cycle (CRC) bits are added to each TB prior to transfer to the encoder.

The codewords are then passed to a layer mapper component 403 that maps the codewords to one or more channel layers. The mapped streams are then passed to a precoder component 404 that applies the precoders to the respective streams. Then at 405, the resultant encoded streams can be passed through IFFT blocks and to their respective antennas for transmission. Please note that IFFT block is necessary for some communication systems which implements OFDMA as the access technology (For example 5G, LTE/LTE-A). However, in other systems the IFFT block may be different or unnecessary, depending on the multiple access system.

In accordance with multicodeword MIMO wherein the number N of transmit antennas $N_t$ and receive antennas $N_r$ is two or more, the theoretical upper bound of codewords is N, wherein each codeword corresponds to a different transport block (e.g., $N_c=N_t$). Accordingly, each TB ($TB_1-TB_{Nc}$) would be provided to a corresponding encoder (e.g., encoder 1–encoder Nc), and interleaver and modulator (e.g., interleaver/modulator 1–interleaver/modulator Nc), to generate codewords for each TB (e.g., codeword 1–codeword Nc). For example, with respect to a 4×4 single user MIMO scenario, each antenna can theoretically have a different codewords. This means four different streams can be transmitted during the same TTI. This is the best case scenario or upper bound, wherein each stream has its own codeword (e.g., code rate/modulation index). As the SNR increases, the greater the number of codewords employed relative to the maximum number of codewords possible for a given MIMO system (e.g., based on the transmission rank), the better the system performance is in terms of throughput, spectrum efficiency, and the like.

Figure 5:
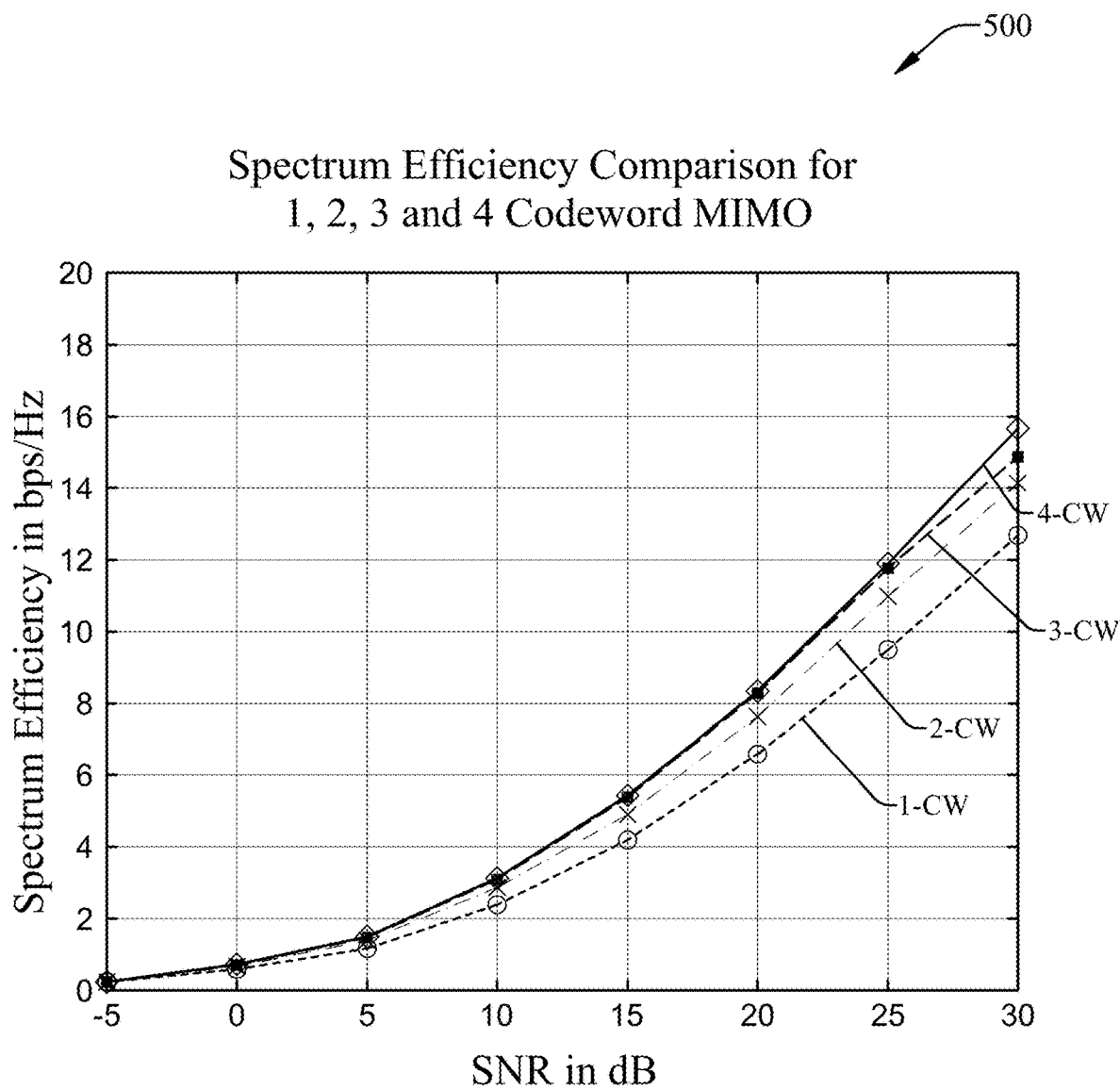
FIG. 5 provides a chart illustrating the spectrum efficiency comparison for 1, 2, 3 and 4 codeword MIMO in accordance with various aspects and embodiments of the subject disclosure.

For example, FIG. 5 provides a chart 500 illustrating the spectrum efficiency comparison for 1, 2, 3 and 4 codeword MIMO in accordance with various aspects and embodiments of the subject disclosure. Chart 500 depicts the effect usage of 1, 2, 3 and 4 codewords has on spectrum efficiency in bits per second/Hertz (bps/Hz) as the SNR, measured in decibels (dB) increases. Chart 500 includes four lines respectively identified as 1-CW, (which corresponds to one codeword), 2-CW (which corresponds to two codewords), 3-CW (which corresponds to three codewords), and 4-CW (which corresponds to four codewords). As shown in chart 500 as the SNR increases above 10.0 dB, the four lines respectively begin to separate and continue to increasingly separate as the SNR increases. In particular, at high SNR between about 20.0 dB and 30.0 dB, the spectrum performance associated with usage of three and four codewords is significantly higher relative to that associated with usage of one and two codewords.

With reference to FIGS. 4 and 5, as shown in FIG. 5, the number of codewords employed at low SNR has little impact on the system performance (e.g., in terms of throughput, spectrum efficiency, etc.). Accordingly, at low SNR, the number of codewords employed for the downlink transmission can be decreased without impacting the system performance. Likewise, at high SNR, the number of codewords employed for downlink transmission can be increased to improve system performance. This is called link adaptation. In various embodiments, such link adaptation can be controlled by the adaptive controller component 407. For example, based on reception of CSI feedback information 406 indicating that the SNR conditions are low, the adaptive controller component 407 can direct the codeword configuration component 402 to decrease the modulation and use a more robust code rate and/or fewer codewords. Similarly, based on reception of CSI feedback information 406 indicating that the SNR conditions are good, the adaptive controller component 407 can direct the codeword configuration component 402 to increase the modulation and use a higher code rate and/or more codewords. In this regard, the SNR values that respectively correspond to different levels of channel conditions on a measure of poor, to good to excellent or the like can be predefined. Thus, in the best case scenario, in order to achieve the highest system performance (e.g., the upper bound on the channel capacity), at high SNR and/or SINR channel conditions, the MIMO system should operate at full capacity with a different codeword assigned to each available layer.

However, with conventional multicodeword MIMO, the feedback channel overhead in both the downlink and uplink control channels is proportional to the transmission rank. For example, if the UE reported transmission rank is equal to four, with conventional multicodeword MIMO, the CSI feedback information 406 provided by the UE to the network node 104 will need to include sufficient information to support generation of four separate codewords that are each tailored to the channel conditions associated with each channel layer they will be transmitted on. For instance, the CSI feedback information 406 would need to include four channel quality indicators (CQIs), four encoder code rates, four modulation, etc. So, for example, if each modulation requires four bits, the UE would need to send 16 bits for the modulation information alone each time it reports CSI feedback to the network node 104. Similarly, with respect to the downlink control channel, when reporting the scheduling parameters to the UE (e.g., step 206 in messaging sequence 200), with conventional multicodeword MIMO, the network node would need to report to the UE, four transport block sizes, four modulation indexes, four hybrid automatic repeat request (HARQ) process numbers, four redundancy versions, etc. Accordingly, with conventional multicodeword capable MIMO systems (e.g., meaning any MIMO system with a transmission rank of two or greater), there is a trade-off between system performance achieved through maximizing the number of codewords transmitted and reducing overhead cost.

Codeword dimensioning is one technique employed in current LTE multicodeword capable MIMO systems to reduce such overhead cost associated with the uplink and downlink feedback. With codeword dimensioning, the available channel layers are bundled to support a maximum two codewords. In this regard, up to two TBs can be transmitted per transmission time interval (TTI), where each TB corresponds to one codeword. Each codeword is separately coded using turbo coding and the coded bits from each codeword are scrambled separately. The complex-valued modulation symbols for each of the codewords to be transmitted are mapped onto one or multiple layers.

FIG. 6 provides a chart 600 describing the codeword dimensioning mapping requirements for a four-rank capable MIMO system. As shown in chart 600, the number of codewords allowed is one or two. With respect to usage of one codeword, the codeword mapping includes two options. In the first option, the codeword is mapped to a single layer and the remaining three antennas are inactive. In the second option, the codeword is mapped to two layers and the codeword symbols are split between the two layers and the remaining two antennas are inactive. With respect to usage of two codewords, the codeword mapping includes three options. In the first option, each code word is mapped to its own layer and the remaining two antennas are inactive. In the second option, the first codeword is mapped to a first layer while the second codewords is split between two other layers. The single remaining antenna is inactive. In the third option, the first codeword is split between two layers and the second codeword is split between the other two layers.

Figure 7:
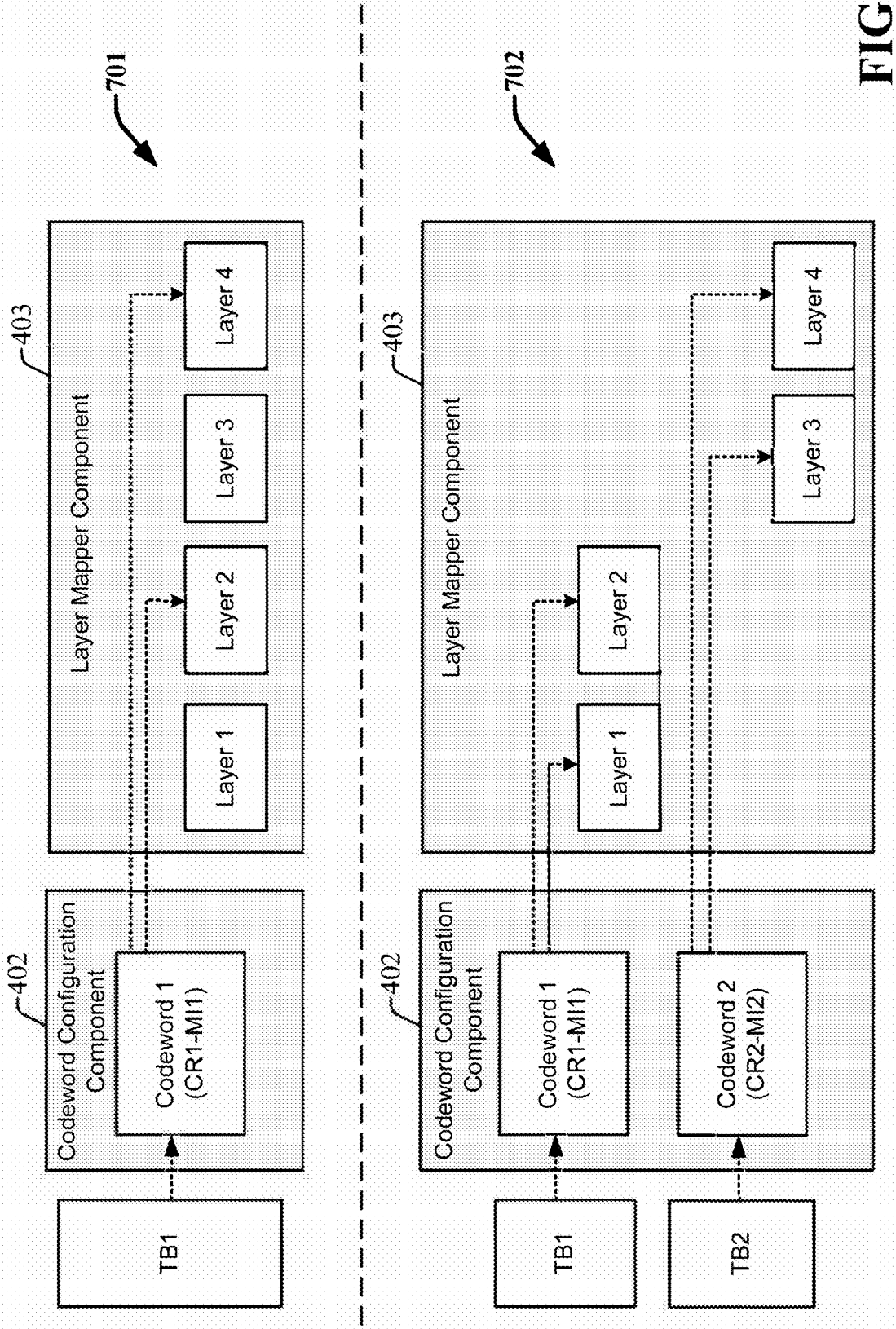
FIG. 7 illustrates example transmission block to layer mappings in accordance with conventional codeword dimensioning.

FIG. 7 illustrates example transmission block to layer mappings in accordance with conventional codeword dimensioning. Repetitive description of like elements employed in respective embodiments is omitted for sake of brevity.

With reference to FIG. 6 and FIG. 7, diagram 701 illustrates an example scenario of application of the second option for one codeword MIMO with codeword dimensioning. As shown in diagram 701, with this option, the codeword configuration component 402 generates a single codeword for a single TB, codeword 1. The single codeword consists of a defined code rate and modulation index, identified in FIG. 7 as CR1-MI1. The single codeword is split and mapped to two layers of the possible four (e.g., layers 2 and 4 in the diagram 701). Diagram 702 illustrates an example scenario of application of option the third option for two codeword MIMO with codeword dimensioning. As shown in diagram 702, with this option, the codeword configuration component 402 generates two codewords, one for each TB1 and another for TB2. Each of the codewords 1 and 2 consist of a defined code rate and modulation index. For example, codeword 1 includes a first code rate and a first modulation index, identified in FIG. 7 as CR1-MI1. Likewise, codeword 2 includes a second code rate and a second modulation index, identified in FIG. 7 as CR2-MI2. The first codeword is split and mapped to layers 1 and 2 and the second codeword is split and mapped to layers 3 and 4. Note that the main principle behind the LTE codeword dimensioning is that whenever the transmission rank is more than two, the TB size is increased to accommodate a greater number of bits. Accordingly, as shown in FIG. 7, when one codeword is used, the TB1 size is larger than the size of respective TBs 1 and 2 when split into two codewords.

As exemplified in FIGS. 6 and 7, with codeword dimensioning, although a MIMO system may support more than two layers, the number of transport blocks and corresponding codewords is still limited to two. As a result, the uplink and downlink feedback can be reduced to include only the information necessary to support one or two codewords. For example, in the case of a 4×4 MIMO transmission scheme, when two codewords are used as opposed to four, the feedback overhead can be reduced 50%. For instance, in furtherance to the example above wherein UE reporting modulations for each layer required four bits and thus sixteen bits total, with codeword dimensioning, when two codewords are used as opposed to four, the UE 102 would only need to report eight bits worth of modulation information. However, the problem with codeword dimensioning however is that by using one or two codewords, although the feedback signaling overhead is reduced, the link throughput is impacted as MIMO layers with different channel qualities are coupled as codeword. For example, consider a scenario where a single codeword is used in association with a MIMO transmission protocol rank of eight and thus eight corresponding layers. In accordance with a one codeword maximum codeword dimensioning protocol, the UE 102 is configured report the channel quality corresponding to the layer which has the lowest SNR. Hence even if the other seven channel layers have high SNRs, the feedback requirements applied by the one codeword maximum codeword dimensioning protocol prevents the network node 104 from scheduling codewords with higher modulation indexes and code rates (or transport block sizes) to the corresponding higher SNR channel layers. This results in significant loss of link throughput, especially as the number of available channel layers increases in higher rank MIMO systems. Thus, when MIMO codeword dimensioning is applied, system performance is degraded at the cost of reduced overhead.

The subject modulation layer mapping techniques provide an alternative and improved solution to codeword dimensioning that provides the link throughput gains attributed to usage of additional codewords relative to the maximum two codewords allowed with codeword dimensioning, while at the same time reducing the signaling feedback overhead traditionally associated with an increasing the number of codewords. The main principle behind modulation layer mapping is that instead of using one modulation per each codeword, the modulation within a codeword can be different for each channel layer or for groups or subsets of channel layers. For example, with respect to a 4×4 MIMO system that uses a single codeword defined by a single code rate (or TB size) and modulation index, the codeword can be defined by a single code rate (or TB size) and two or more modulation indexes. In this regard, each distinct code rate/modulation index pair can be considered separate codewords or sub-codewords. Further, each distinct code rate/modulation index pair can be determined based on the particular SNR associated with each different channel layer to which it is applied. Thus, the modulation index for a codeword (or sub-codeword) that is mapped to a particular layer can be tailored to account for the SNR associated with that layer. In this way, the codeword dimensioning requirement for mapping of a single MIMO codeword to the lowest channel SNR can be eliminated, thereby improving the CQI value feedback by UE to the network node.

Figure 8:
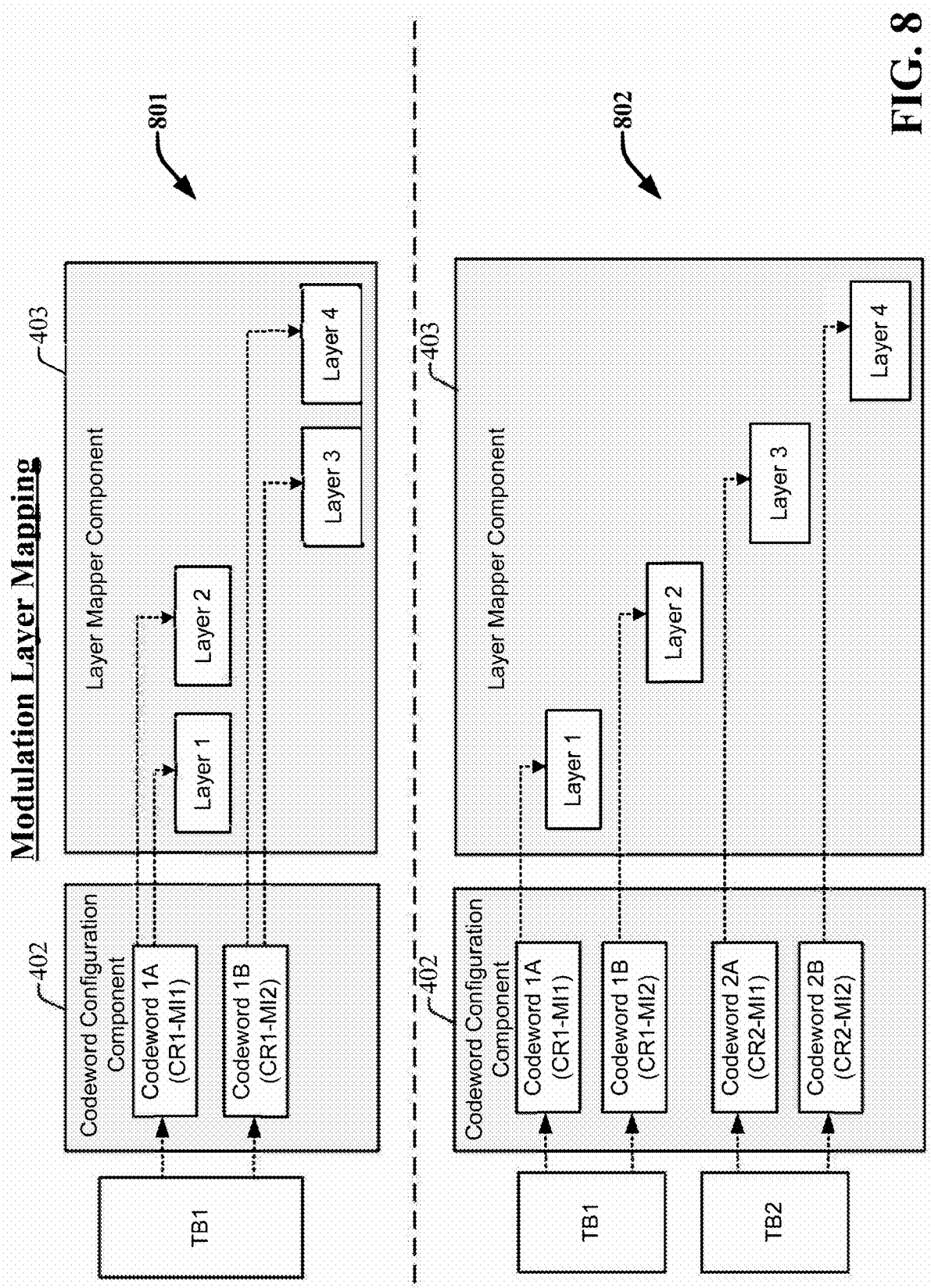
FIG. 8 illustrates example transmission block to layer mappings in accordance with modulation layer mapping in accordance with various aspects and embodiments of the subject disclosure.

FIG. 8 illustrates example transmission block to layer mappings in accordance with modulation layer mapping in accordance with various aspects and embodiments of the subject disclosure. Repetitive description of like elements employed in respective embodiment is omitted for sake of brevity.

Diagram 801 illustrates an example scenario wherein the codeword configuration for a single TB includes two separate codewords (or sub-codewords), referred to as codeword 1A and codeword 1B. Codewords 1A and 1B respectively have the same code rate, CR1. However, codewords 1A and 1B have different modulation indexes, MI1 and MI2. For example, MI1 can include a higher modulation index than MI2. Further codewords 1A can be split and mapped to two layer, layers 1 and 2, and codeword 1B can be split and mapped to the other two layers, layer 3 and 4. In particular, the layer mapper component 403 can be configured to map codeword A1 with the higher modulation index M1 to channels having relatively high SNR and map codeword 1B with the lower modulation index M1 to channels having relatively lower SNR. According to the example scenario depicted in diagram 801, layers 1 and 2 can respectively be associated with higher SNR than layers 3 and 4.

Diagram 802 illustrates another example scenario wherein the codeword configuration for a single TB includes two separate codewords (or sub-codewords), and wherein two TBs are used, TB1 and TB2. In accordance with this scenario, the codeword configuration component 402 can generate four total codewords (or sub-codewords), two for TB1 and two for TB2. In this regard, the codewords for TB1 are referred to as codeword 1A and codeword 1B. Codewords 1A and 1B respectively have the same code rate, CR1. However, codewords 1A and 1B have different modulation indexes, MI1 and MI2. Likewise, the codewords for TB2 can include codeword 2A and codeword 2B. Codewords 2A and 2B respectively have the same code rate, CR2, wherein CR1 is different (e.g., in size) than CR2. However, codewords 2A and 2B have different modulation indexes, MI1 and MI2, respectively. Further, because four codewords are generated, each codeword can be mapped to a single layer. For example, in the embodiment shown, codeword 1A is mapped to layer 1, codeword 1B is mapped to layer 2, codeword 2A is mapped to layer 3 and codeword 2B is mapped to layer 4. The particular layer to which each codeword is mapped can be based on the code rate/modulation index pair of the codeword, (or vice versa), such that the layers associated with higher SNR conditions can carry codewords with higher code rates and modulation indexes.

It should be appreciated that the codeword configuration with respect to the particular modulation index applied to the respective codewords 1A, 1B, 2A, and 2C is merely exemplary. For example, in some implementation, each of the codewords can have entirely different modulation indexes (e.g., MI1, MI2, MI3 and MI4). In another embodiment, three modulation indexes can be used. For example, codeword 1A can use MI1, codeword 1B can use MI2, codeword 2A can use MI1 and codeword 2B can use MI3.

For example, MI1 can include a higher modulation index than MI2. Further codewords 1A can be split and mapped to two layer, layers 1 and 2, and codeword 1B can be split and mapped to the other two layers, layer 3 and 4. In particular, the layer mapper component 403 can be configured to map codeword A1 with the higher modulation index M1 to channels having relatively high SNR and map codeword 1B with the lower modulation index M1 to channels having relatively lower SNR. According to the example scenario depicted in diagram 801, layers 1 and 2 can respectively be associated with higher SNR than layers 3 and 4.

With reface to FIGS. 1, 3 and 4, in accordance with various embodiments, in association with establishment of a wireless communication link with the network node, the UE 102 can be configured to determine codeword information based on the CSI. As described infra with reference to FIGS. 9 and 10, this codeword information can include one or more recommended code rates. For each code rate, the codeword information can further include the number of modulation indexes determined for the code rate (which can be one or more), the actual modulation index or modulation indexes (e.g., when two or more modulation indexes are determined), and the layer or group of layers the modulation index applies or the respective modulation indexes apply (e.g., when two or more modulation indexes are determined). The UE 102 can further be configured to provide the codeword information to the network node 104, along with the CSI.

The network node 104 can further evaluate the codeword information, the CSI information, and other network condition information (e.g., CSI determined at the transmitter side, available network resources, network side scheduling constraints, etc.) to determine and apply the codeword scheduling parameters for the downlink data communications. For example, the network node 104 can be configured to determine the particular codeword configuration (e.g., code rate/modulation index) for application by the codeword configuration component 402, and the layer mapping for application by the layer mapper component 403, based on the codeword information, the CSI feedback information 406, and other network condition information (e.g., CSI determined at the transmitter side, available network resources, network side scheduling constraints, etc.). The adaptive controller component 407 can further direct the codeword configuration component 402 and the layer mapper component 403 to perform codeword scheduling parameters. By doing this, the layer mapping where the modulation indexes are mapped can be adapted based on channel conditions and the feedback signal overhead scales accordingly. The adaptive controller component 407 can further direct the codeword configuration component 402 and the layer mapper component 403 to dynamically change the codeword configuration and layer mapping to account for changes in channel and network conditions.

Figures 9, 10:
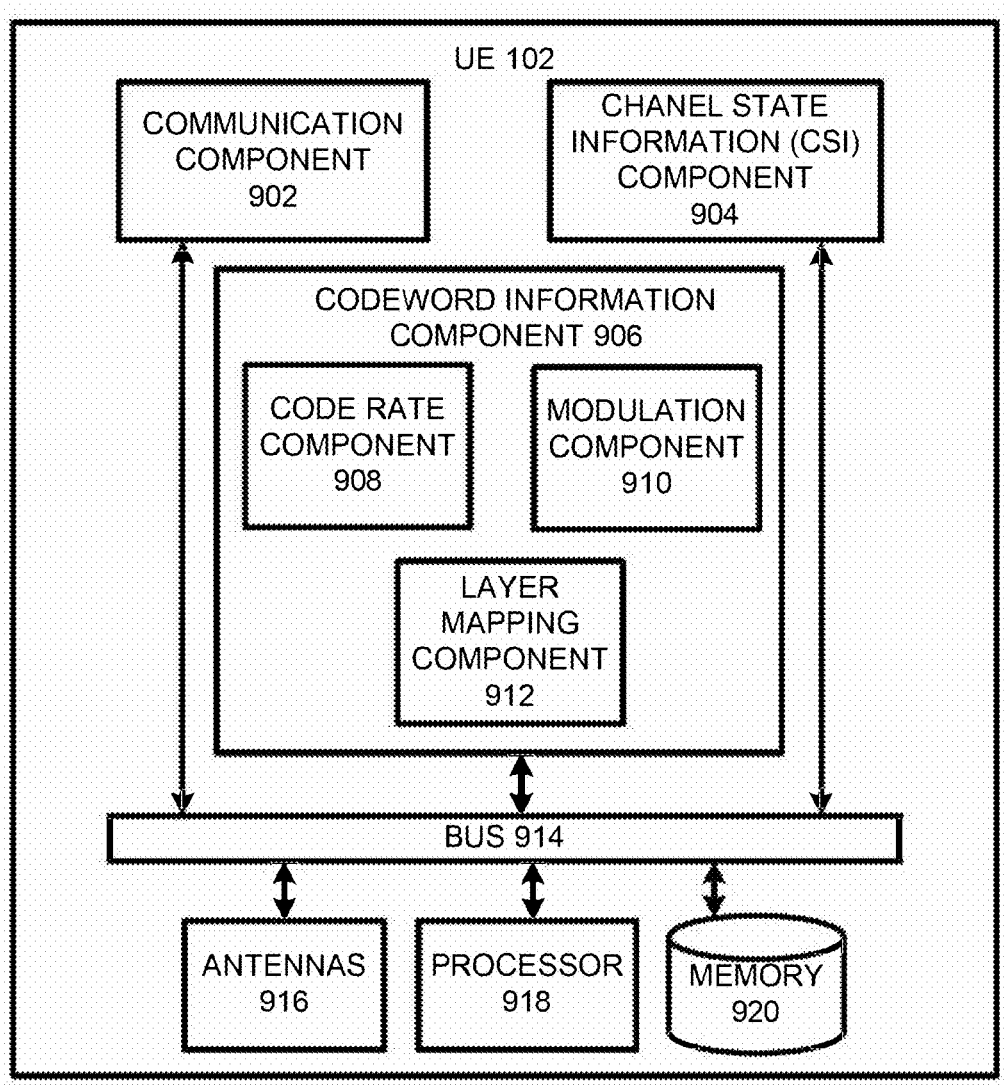
FIG. 9 illustrates an example user equipment (UE) that facilitates modulation layer mapping in accordance with various aspects and embodiments of the subject disclosure.
FIG. 10 provides a chart demonstrating example codeword information in accordance with various aspects and embodiments of the subject disclosure.

FIG. 9 illustrates an example UE (e.g., UE 102) that facilitates modulation layer mapping in accordance with various aspects and embodiments of the subject disclosure. Repetitive description of like elements employed in respective embodiment is omitted for sake of brevity.

In various embodiments, the UE 102 can include communication component 902, CSI component 904, codeword information component 906, and a plurality of antennas 916. The UE 102 can include memory 920 to store computer executable components and instructions of the UE. For example, although depicted outside of the memory 920, these computer executable components and instructions can include the communication component 902 and/or software instructions associated with the communication component 902, the CSI component 904, and the codeword information component 906. The UE 102 can also include a processor 918 to facilitate operation of the instructions (e.g., the computer executable components and instructions) by the UE 102. Examples of said processor 918 and memory 920, as well as other suitable computer or computing-based elements that can be employed by the UE 102, can be found with reference to FIG. 16. The UE can further include a device bus 914 that couples the various components of the UE 102 including, but not limited to, the communication component 902, the CSI component 904, the codeword information component 906, the plurality of antennas 916, the processor 918 and the memory 920.

The communication component 902 can facilitate wireless communication between the UE 102 and other devices, such as between the UE 102 and the network node 104, the UE 102 and other UEs, the UE and one or more network devices, and the like. The communication component 902 can be or include hardware (e.g., a central processing unit (CPU), one or more decoders, etc.), software (e.g., a set of threads, a set of processes, software in execution) or a combination of hardware and software that facilitates MIMO communication protocols, including at least the subject modulation layer mapping protocol. The communication component 902 can be communicatively coupled to the plurality of antennas 916 of the UE 102. The number of the antennas 916 can vary. Each of the antennas can provide for transmitting and receiving radio frequency (RF) signals. The communication component 902 can include hardware and/or software to facilitates processing RF signals transmitted to the UE 102 from another device (e.g., decoding, de-mapping, de-interleaving, removing interference, etc.). The communication component 902 can also include hardware and/or software that facilitates transmitting RF data signals to other devices (e.g., encoding).

The CSI component 904 can be configured to determine CSI based on reference or pilot signals received from the network node 104 (e.g., CSI-RS, DM-RS, etc.). This CSI can include one or more parameters related to but not limited to, CQI information, PMI information, RI information, MCS information, PMI information, beamforming weights, delay spread, Doppler spread, Doppler shift, average gain, and average delay, and the like. In various embodiments, based on the reference signals, the CSI component 904 can further determine the SNR and/or SINR associated with the respective channel layers of a MIMO communication protocol employed by the UE. In particular, the CSI component 904 can determine the SNR and/or SINR associated with each channel layer.

The codeword information component 906 can be configured to determine the codeword information based on the CSI information. In various embodiments, once determined, the communication component 902 can be configured to transmit the codeword information (e.g., codeword information provided in chart 1000) to the network node 104 in association with the CSI report sent via the uplink control channel.

FIG. 10 provides a chart 1006 demonstrating example codeword information capable of being determined by the codeword information component 906 in accordance with various aspects and embodiments of the subject disclosure. Repetitive description of like elements employed in respective embodiments is omitted for sake of brevity.

As shown in chart 1000, the codeword information can identify one or more code rates, the number of modulations determined for each code rate, the specific modulation indexes (e.g., the modulation values) determined, and the modulation index to layer mapping, that indicates which layer the respective modulation indexes are valid or otherwise assigned to. In the example shown in chart 1000, the codeword information identifies two code rates (CR1 and CR2), indicates that each code rate is associated with two modulations, and provides the respective modulation indexes for each code rate, MI1 and MI2). The codeword information further identifies the recommended modulation index mapping for CR1 is MI1 to layers 1 and 2 (e.g., MI1-L1 and MI1-L2), and the MI2 to layer 3 and 4 (e.g., MI2-L3 and MI2-L4). Likewise, the codeword information further identifies the recommended modulation index mapping for CR2 is MI1 to layers 1 and 3 (e.g., MI1-L1 and MI1-L3), and the MI2 to layer 2 and 4 (e.g., MI2-L2 and MI2-L4). It should be appreciated that the code rates CR1 and CR2 can represent suitable code rate (or RB sizes) values and that the modulation indexes MI1 and MI2 can represent suitable modulation index values. Further, although CR1 and CR2 are each associated with MI1 and MI2, it should be appreciated that the modulation indexes determined for different code rates can vary. For example, CR2 can be associated with entirely different modulation indexes (e.g., M3 and M4 for example).

Wither reference back to FIG. 9, the codeword information component 906 can include code rate component 908, modulation component 910 and layer mapping component 912. In various embodiments, the code rate component 908 can be configured to determine the code rates for forming codewords recommended by the UE. In various embodiments, the number of code rates determined by the code rate component 908 can be based at least in part on the transmission rank of the UE (e.g., the RI value), and/or the CSI. For example, in some implementations, the code rate component 908 can be configured to determine a number of code rates that is equal to its current transmission rank. In other implementations, the code rate component 908 can be configured to determine the number of code rates as a fixed percentage or number relative to its transmission rank (e.g., if RI is two determine two code rates, if RI is three determine two code rates, if RI is four determine three code rates, if RI is eight determine five code rates, etc.). According to this implementation, the code rate component 908 can determine the appropriate number of code rates to determine based on predefined information (e.g., stored in memory 920 or otherwise accessible to the code rate component 908) that defines the number of code rates to determine for a particular transmission rank. In another implementation, the code rate component 908 can be configured to determine a fixed number of code rates (e.g., one or two) regardless of its transmission rank. In other embodiments, the code rate component 908 can also determine the number of code rates based on various other CSI parameters, such as but not limited to, the respective SNR and/or SINR values associated with the respective channel layers. For example, according to these embodiments, the code rate component 908 can be configured to determine a greater number of code rates as the SNR and/or SINR values associated with the respective channels increase. In this regard, the code rate component 908 can determine the number of code rates based on both its transmission rank (which indicates the number of available channel layers) and the respective SNR and/or SINRs associated with each of the channel layer.

The code rate component 908 can further determine the values for the respective code rates. In some implementations, the specific values for the code rates (or code rate) can be predefined based on the number of code rates determined and/or the transmission rank of the UE. In other implementations, the code rate component 908 can be configured to determine the values of the code rates (or code rate), based on the number of code rates determined, the transmission rank, and the respective SNR and/or SINR values associated with the respective channels. For example, the code rate component 908 can be configured to determine higher code rates for channels associated with high SNR and/or SINR values and lower code rates for channels associated with low SNR and/or SINR values.

The modulation component 910 can be configured to determine one or more modulation indexes for each code rate determined by the code rate component 908. The number of modulation indexes per code rate determined by the modulation component 910 can vary based on the channel conditions (e.g., SNR and/or SINR associated with the respective channels), the number of channels (or the transmission rank), the number of code rates, and/or the values of the code rates. In some implementations, the number of modulation indexes can be capped at one or two regardless of the transmission rank. In other implementations, the number of modulation indexes can increase beyond two as the transmission rank increases, wherein the number of modulation indexes is a defined percentage or number relative to the transmission rank. In this regard, the number of modulation indexes can be less than or equal to the transmission rank.

In various embodiments, because the CSI component 904 can estimate the channel conditions from the CSI-RS, it can estimate the SNR and/or SINR each layer. The modulation component 910 can further determine the number of modulation indexes for a given code rate and the specific values for the modulation indexes based on the SNR and/or SINR associated with each channel. For example, in one implementation, the codeword information component 906 can be configured to evaluate the SNR and/or SINRs associated with each available channel and identify the lowest or minimum SNR and/or SINR value (and its associated channel) among the respective SNR and/or SINR values associated with the respective channels. The code rate component 908 and the modulation component 910 can further respectively determine a baseline code rate and modulation index based on the minimum SNR and/or SINR. The code rate component 908 and the modulation component 910 can respectively then determine one or more additional code rates and modulation indexes for the remaining layers (other than the channel layer associated with the minimum SNR/SINR) based this base line code rate and modulation index. For example, the modulation component 910 can further identify one or more of the remaining channel layer associated with a relatively higher SNR and/or SINR and determine a different (higher) modulation index for these layers based on their higher SNR and/or SINR condition.

By determining the modulation indexes based on the particular SNR and/or SINR associated with the different layers, the modulation component 910 can tailor the modulation indexes to the specific conditions associated with each channel. In some implementations, depending on the channel conditions, the modulation component 910 can determine a different modulation index for each layer. In other implementations, the modulation component 910 can group two or more layer associated with same or similar SNR and/or SINR values. With these implementations, the modulation component 910 can determine one modulation index for the group of layers. Accordingly, in some implementations in which all of the layers have same or similar SNR and/or SINR values, the modulation component 910 can determine a single modulation index for all the layers. Thus, if the SNR and/or SINRs are the same or substantially the same for all the layers for a given code rate, then the modulation component choose only one modulation and the layers where this modulation is applicable.

Accordingly, the amount of codeword information provided by the UE to the network node will scale based on the channel conditions. For example, in some implementations, the UE may only report and recommend a single code rate and modulation index for all layers (i.e., a single codeword for all layers). In other implementations, the UE may report a single code rate, two modulation indexes and the respective layers each of the two modulation indexes are assigned. In yet another implementation, the UE may report several different code rates, several different modulation indexes for each code rate, and the corresponding layer mapping information for the different code rate/modulation index pairs.

The layer mapping component 912 can be configured to map each modulation index determined by the modulation component 910 to a specific channel. In this regard, because the modulation component 910 determines the modulation indexes based on the corresponding layer SNR/SINRs, the modulation component 910 can inform the layer mapping component 912 which modulation indexes are associated with which SNRs/SINRs. The layer mapping component 912 can further determine and apply the modulation indexes to the corresponding layers having those SNRs and/or SINR values. In other implementations, the modulation component 910 can simply information the layer mapping component 912 which layer or group of layers a particular modulation index was determined for.

Figure 11:
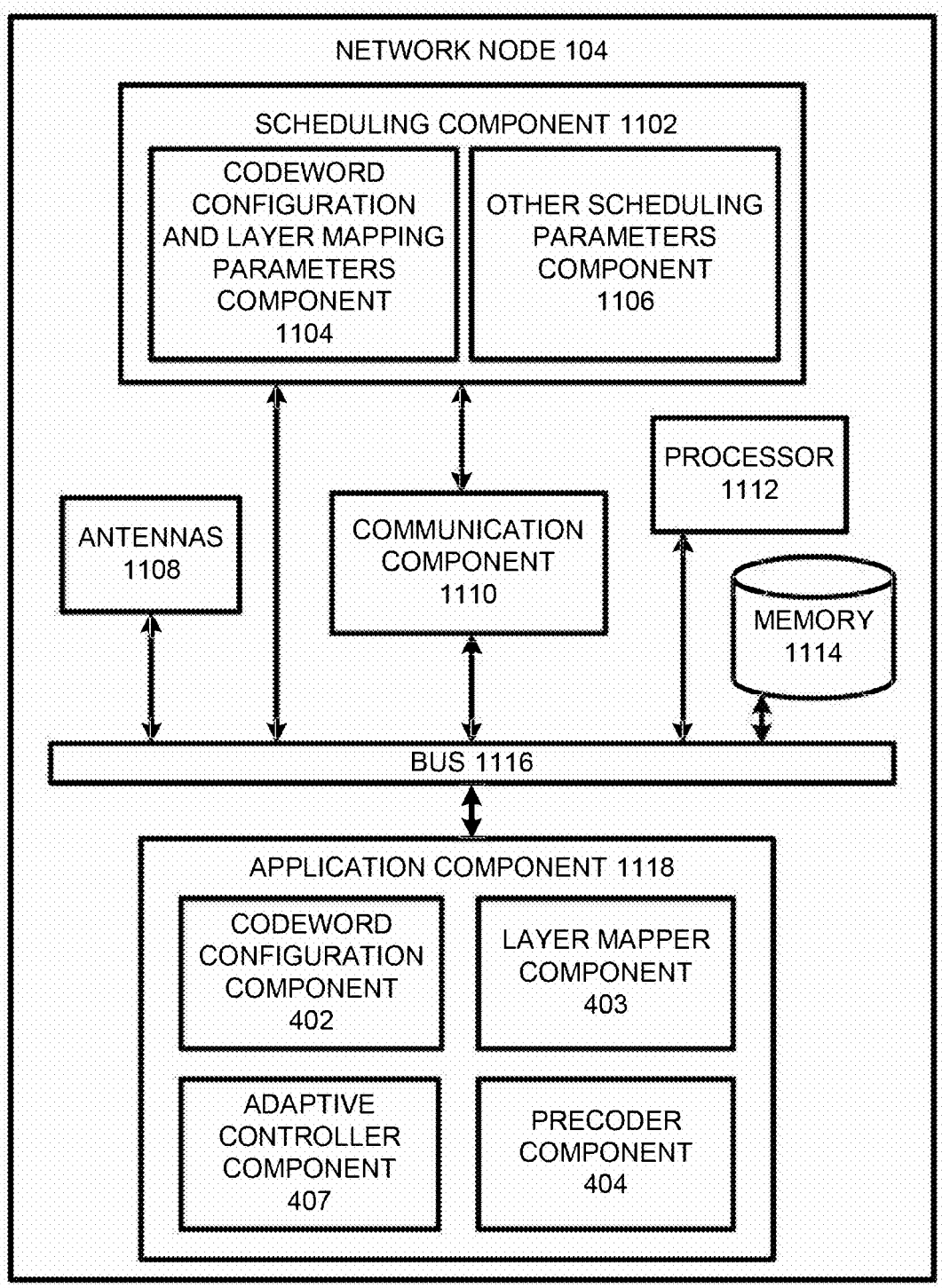
FIG. 11 illustrates an example network node that facilitates modulation layer mapping in accordance with various aspects and embodiments of the subject disclosure.

FIG. 11 illustrates an example network node (e.g., network node 104) that facilitates modulation layer mapping in accordance with various aspects and embodiments of the subject disclosure. Repetitive description of like elements employed in respective embodiments is omitted for sake of brevity.

In various embodiments, the network node 104 can include scheduling component 1102, a plurality of antennas 1108, communication component 1110, and application component 1118. The network node 104 can include memory 1114 to store computer executable components and instructions. For example, although depicted outside of the memory 1114, the computer executable components stored by the memory 1114 can include software instructions associated with the communication component 1110, the scheduling component 1102, and the application component 1118. The network node 104 can also include a processor 1112 to facilitate operation of the instructions (e.g., the computer executable components and instructions) by the network node 104. Examples of said processor 1112 and memory 1114 as well as other suitable computer or computing-based elements that can be employed by the network node 104, can be found with reference to FIG. 16. The network node 104 can further include a device bus 1116 that couples the various components of the network node 104 including, but not limited to, the communication component 1110, the scheduling component 1102, the plurality of antennas 1108, the processor 1112 and the memory 1114.

The communication component 1110 can facilitate wireless communication between the network node 104 and other devices, such UEs (e.g., UE 102). In this regard, the communication component 1110 can provide same or similar feature and functionalities as the communication component 902. The communication component 1110 can also facilitate wired and wireless communication between the network node 104 and one or more network devices.

The scheduling component 1102 can be configured to determine downlink communication scheduling parameters for a particular UE based on the CSI and codeword information determined and provided by the UE 102. These scheduling parameters can include but are not limited to: the assigned MSC, power usage requirements, PRB assignments, the number of channel layers scheduled, the codewords scheduled for the respective channel layers (e.g., including the code rates (or transport block sizes) and the modulation index for each codeword), parameters related to HARQ, sub-band locations, PMIs corresponding to the respective sub-bands, and the like. The communication component 1110 can further be configured to provide the UE 102 with the scheduling parameters via the downlink control channel prior to performing the downlink data transmissions. The UE communication component (e.g., communication component 902) can further subsequently employ the scheduling parameters to decode the received downlink data transmissions.

In the embodiment shown, the scheduling component 1102 can include codeword configuration and layer mapping parameters component 1104 and other scheduling parameters component 1106. In one implementation, the codeword configuration and layer mapping parameters component 1104 can be particularly configured to determine the codeword configuration and layer mapping parameters for the downlink transmission, and the other scheduling parameters component 1106 can be configured to determine the other scheduling parameters (e.g., MSC, power usage requirements, PRB assignments, HARQ, sub-band locations, PMIs, etc.). The codeword configuration and layer mapping parameters include the number of codewords used, the particular code rate/modulation index for each code word, and the particular layers to which each codeword is assigned. In this regard, unlike the restrictions imparted by codeword dimensioning, in some implementation, the codeword configuration and layer mapping parameters component 1104 can determine whether to use one, two or more codewords based on the CSI feedback information, the codeword information recommended by the UE and other network conditions (e.g., transmitter side CSIT, available network resources, network side scheduling constraints, etc.). Further, based on the CSI feedback information, the codeword information and/or other network conditions, the codeword configuration and layer mapping parameters component 1104 can determine whether to use one, two or more modulation indexes for a particular code rate and further determine which layer or group of layers to apply each distinct code rate/modulation index pair.

In some implementations, the network node 104 can apply the same codeword configuration (e.g., code rate/modulation index) and layer mappings recommended by the UE as provided in the codeword information. In other implementations, the UE can provide several (e.g., two or more) different codeword configuration and layer mapping options and the network node 104 can determine and apply one or more of the UE recommended codeword configurations and layer mappings that is most appropriate based on the channel conditions and/or various other applicable factors (e.g., transmitter side CSIT, available network resources, network side scheduling constraints, etc.). In yet another implementation, the network node 104 can modify a UE recommended codeword configuration and layer mapping based on the channel conditions and/or various other applicable factors (e.g., network resources, network side scheduling constraints, etc.) to determine optimal scheduling parameters including optimal codeword configuration and modulation index layer mapping.

Once the scheduling component 1102 has determined the final downlink scheduling parameters, the scheduling component 1102 can direct the application component 1118 to apply the scheduling parameters in association with encoding TBs and carrying out the downlink data transmissions to the UE. For example, the application component 1118 can include suitable hardware and/or software (e.g., the codeword configuration component 402, the layer mapper component 403, the adaptive controller component 407, the precoder component 404, and the like) process and TBs in accordance with the determined scheduling parameters and carry out the MIMO transmission protocol.

Figure 12:
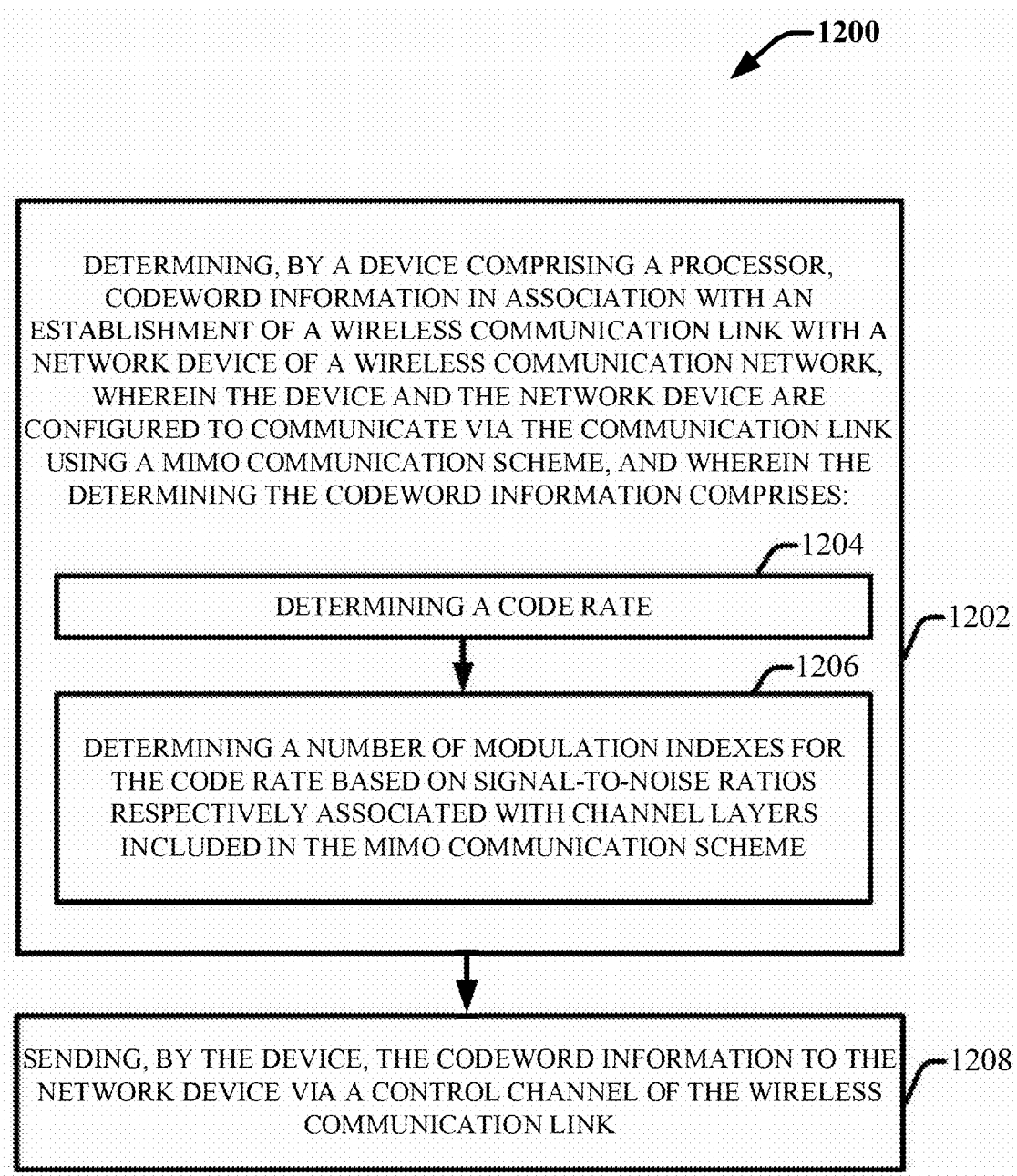
FIG. 12 illustrates an example method that employs modulation layer mapping to improve the performance of MIMO communication systems in accordance with various aspects and embodiments of the subject disclosure.
Figure 13:
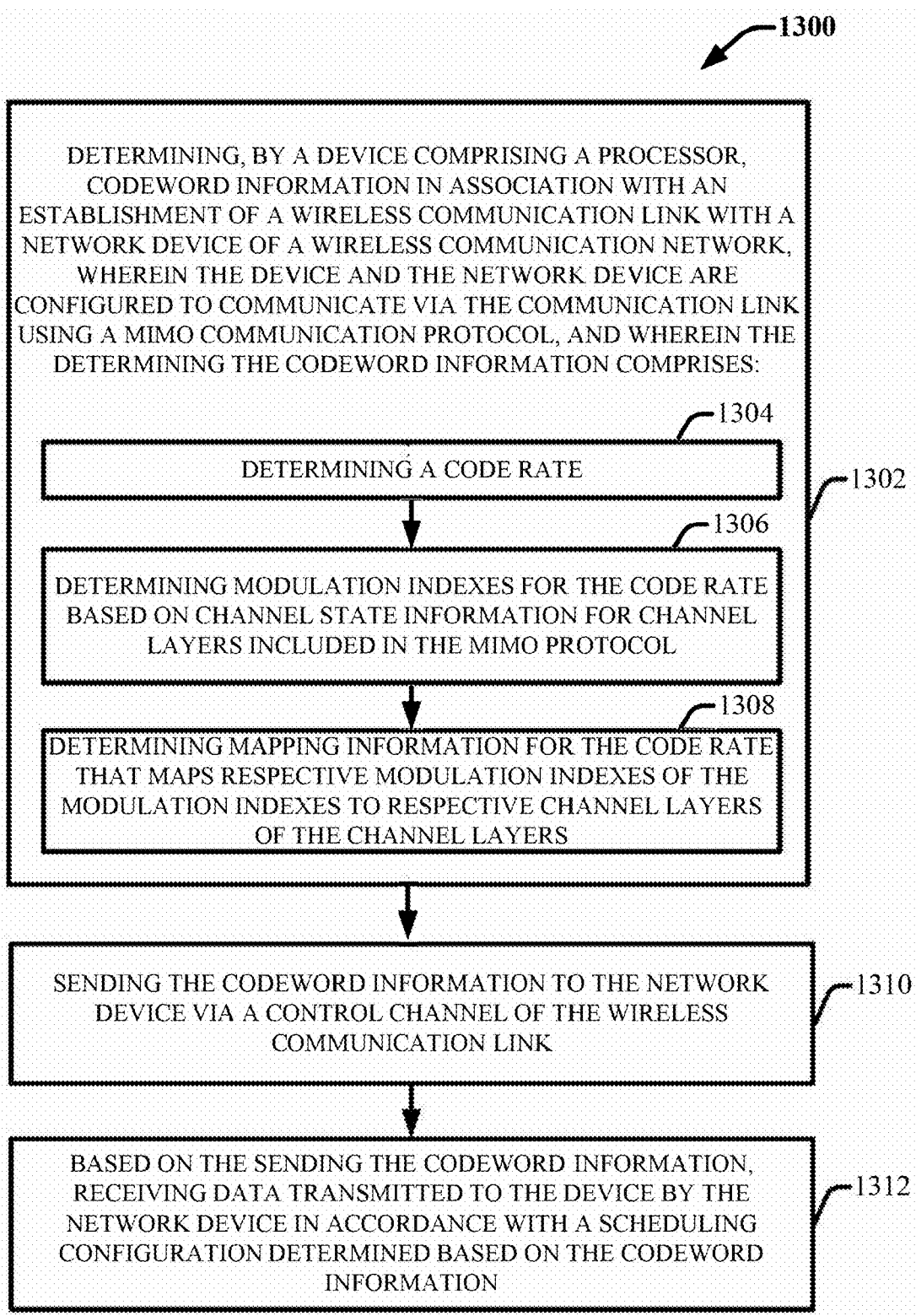
FIG. 13 illustrates another example method that employs modulation layer mapping to improve the performance of MIMO communication systems in accordance with various aspects and embodiments of the subject disclosure.
Figure 14:
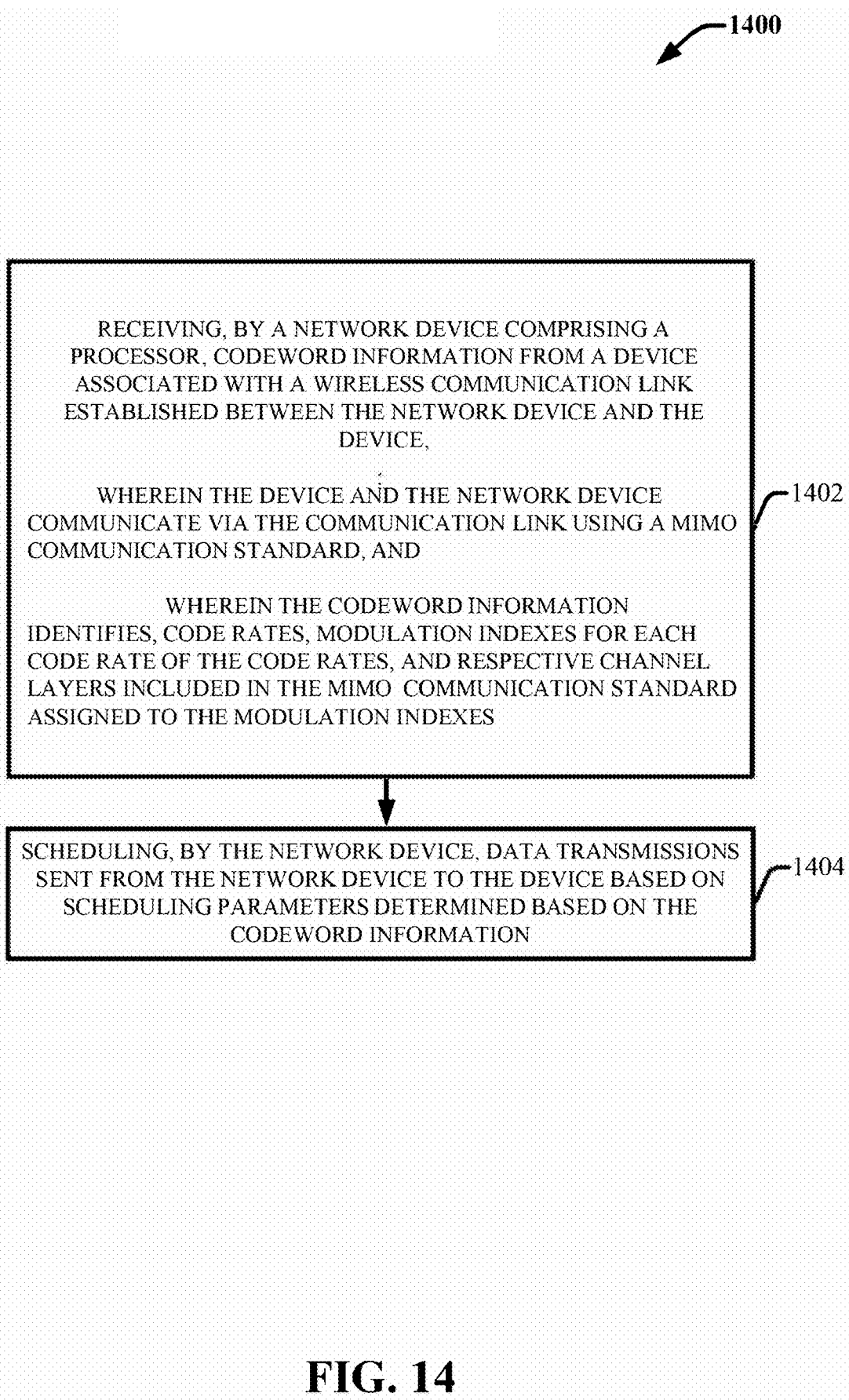
FIG. 14 illustrates another example method that employs modulation layer mapping to improve the performance of MIMO communication systems in accordance with various aspects and embodiments of the subject disclosure.

In view of the example system(s) described above, example method(s) that can be implemented in accordance with the disclosed subject matter can be better appreciated with reference to flowcharts in FIGS. 12-14. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 12 illustrates an example method 1200 that employs modulation layer mapping to improve the performance of MIMO communication systems in accordance with various aspects and embodiments of the subject disclosure. Repetitive description of like elements employed in respective embodiments is omitted for sake of brevity.

At 1202, a network device comprising a processor (e.g., UE 102, and the like), determines codeword information in association with establishment of a wireless communication link with a network device (e.g., network node 104) of a wireless communication network (e.g., system 100), wherein the device and the network device are configured to communicate via the communication link using a MIIMO communication scheme (e.g., multicodeword MIMO). In accordance with method 1200, the process of determining the codeword information comprises determining a code rate at 1204 (e.g., via code rate component 908), and at 1206 determining a number of modulation indexes for the code rate based on signal-to-noise ratios respectively associated with channel layers included in the MIMO communication scheme (e.g., via modulation component 910). The method further comprises, at 1208, sending, by the device, the codeword information to the network device via a control channel of the wireless communication link (e.g., via communication component 902).

FIG. 13 illustrates another example method 1300 that employs modulation layer mapping to improve the performance of MIMO communication systems in accordance with various aspects and embodiments of the subject disclosure. Repetitive description of like elements employed in respective embodiments is omitted for sake of brevity.

At 1302, a network device comprising a processor (e.g., UE 102, and the like), determines codeword information in association with establishment of a wireless communication link with a network device (e.g., network node 104) of a wireless communication network (e.g., system100), wherein the device and the network device are configured to communicate via the communication link using a MIIMO communication protocol (e.g., multicodeword MIMO). In accordance with method 1200, the process of determining the codeword information comprises determining a code rate at 1304 (e.g., via code rate component 908), determining modulation indexes for the code rate based on CSI for channel layers included in the MIMO protocol at 1306 (e.g., via modulation component 910), and at 1308, determining mapping information for the code rate that maps respective modulation indexes of the modulation indexes to respective channel layers of the channel layers (e.g., via layer mapping component). The method further comprises, at 1310, sending, by the device, the codeword information to the network device via a control channel of the wireless communication link (e.g., via communication component 902). Further, at 1312, based on the sending the codeword information, receiving (e.g., via the communication component 902) data transmitted to the device by the network device in accordance with a scheduling configuration determined based on the codeword information.

FIG. 14 illustrates another example method 1400 that employs modulation layer mapping to improve the performance of MIMO communication systems in accordance with various aspects and embodiments of the subject disclosure. Repetitive description of like elements employed in respective embodiments is omitted for sake of brevity.

At 1402, the method comprises, receiving, by a network device comprising a processor (e.g., network node 104), codeword information from a device (e.g., UE 102) associated with a wireless communication link established between the network device and the device, wherein the device and the network device communicate via the communication link using a MIMO communication standard, and wherein the codeword information identifies, code rates, modulation indexes for each code rate of the code rates, and respective channel layers included in the MIMO communication standard assigned to the modulation indexes. At 1404, the method further comprises scheduling, by the network device, data transmissions sent from the network device to the device based on scheduling parameters determined based on the codeword information (e.g., via the scheduling component 1102).

Figure 15:
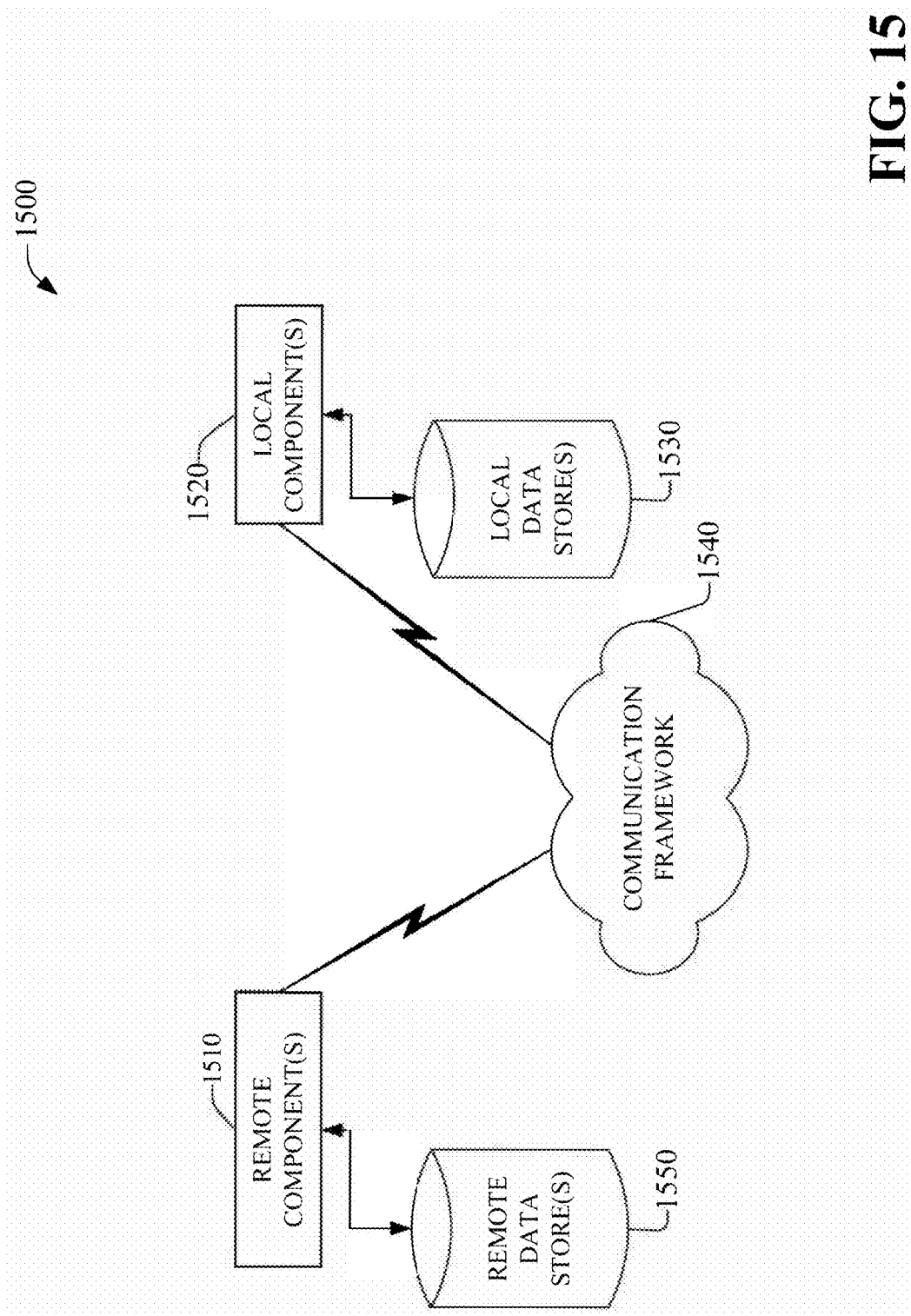
FIG. 15 depicts an example schematic block diagram of a computing environment with which the disclosed subject matter can interact.

FIG. 15 is a schematic block diagram of a computing environment 1500 with which the disclosed subject matter can interact. The system 1500 comprises one or more remote component(s) 1510. The remote component(s) 1510 can be hardware and/or software (e.g., threads, processes, computing devices). In some embodiments, remote component(s) 1510 can comprise servers, personal servers, wireless telecommunication network devices, RAN device(s), etc. As an example, remote component(s) 1510 can be network node 104, one or more devices included in the communication service provider networks 106, and the like. The system 1500 also comprises one or more local component(s) 1520. The local component(s) 1520 can be hardware and/or software (e.g., threads, processes, computing devices). In some embodiments, local component(s) 1520 can comprise, for example, a UE 102, one or more components of the UE 102, and the like etc.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via an LTE network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Figure 16:
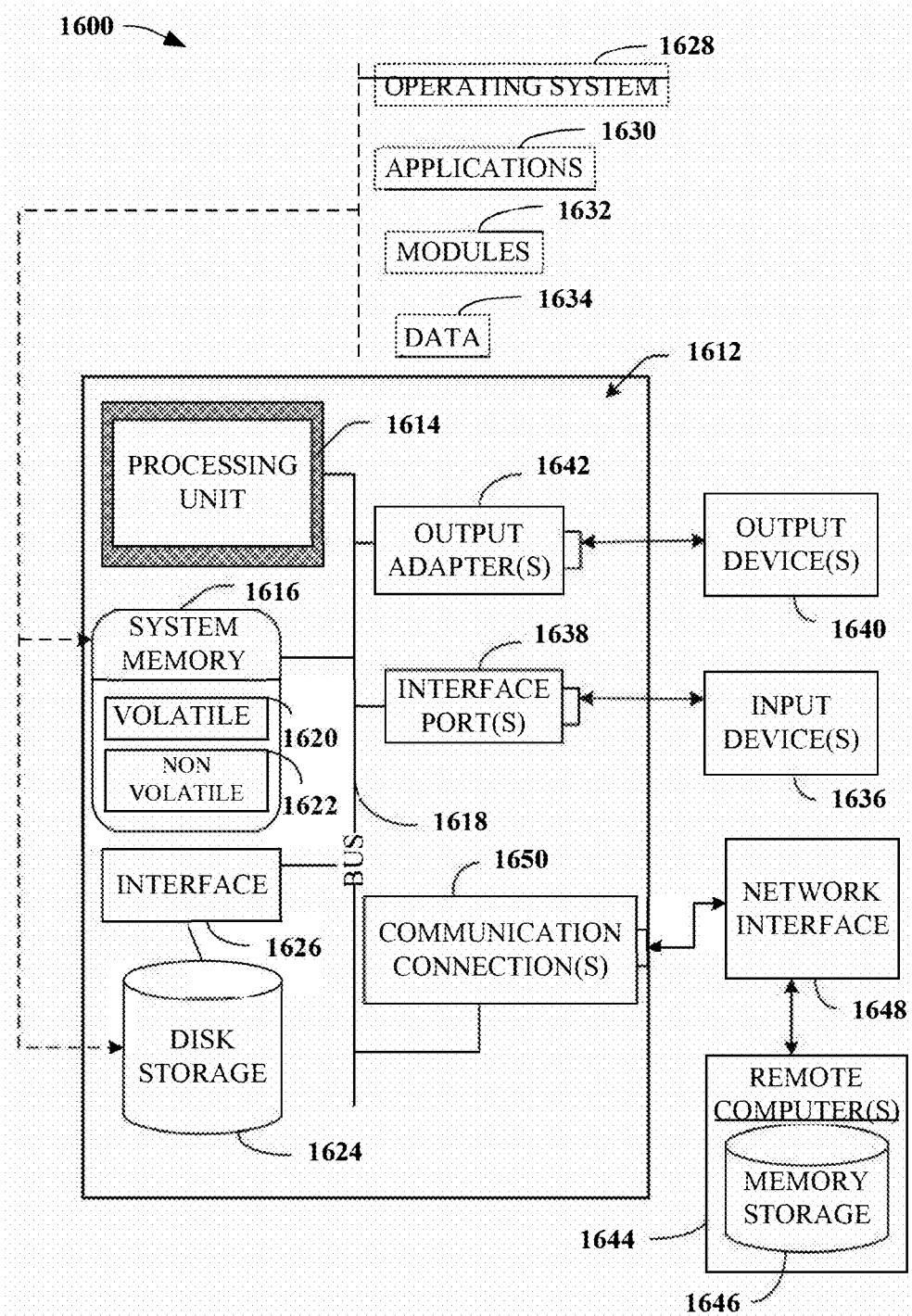
FIG. 16 illustrates an example block diagram of a computing system operable to execute the disclosed systems and methods in accordance with an embodiment.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1620 (see below), nonvolatile memory 1622 (see below), disk storage 1624 (see below), and memory storage 1646 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 16 illustrates a block diagram of a computing system 1600 operable to execute the disclosed systems and methods in accordance with an embodiment. Computer 1612, which can be, for example, a UE (e.g., UE 102), a network node (e.g., network node 104), or the like, can comprise a processing unit 1614, a system memory 1616, and a system bus 1618. System bus 1618 couples system components comprising, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 16164), and small computer systems interface.

System memory 1616 can comprise volatile memory 1620 and nonvolatile memory 1622. A basic input/output system, containing routines to transfer information between elements within computer 1612, such as during start-up, can be stored in nonvolatile memory 1622. By way of illustration, and not limitation, nonvolatile memory 1622 can comprise read only memory, programmable read only memory, electrically programmable read only memory, electrically erasable read only memory, or flash memory. Volatile memory 1620 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1612 can also comprise removable/non-removable, volatile/non-volatile computer storage media. FIG. 16 illustrates, for example, disk storage 1624. Disk storage 1624 comprises, but is not limited to, devices like a magnetic disk drive, floppy disk drive, tape drive, flash memory card, or memory stick. In addition, disk storage 1624 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1624 to system bus 1618, a removable or non-removable interface is typically used, such as interface 1626.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alterative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 16 describes software that acts as an intermediary between users and computer resources described in suitable operating environment 1600. Such software comprises an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be noted that the disclosed subject matter can be implemented with various operating systems or combinations of operating systems.

A user can enter commands or information into computer 1612 through input device(s) 1636. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1612. Input devices 1636 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1614 through system bus 1618 by way of interface port(s) 1638. Interface port(s) 1638 comprise, for example, a serial port, a parallel port, a game port, a universal serial bus, an infrared port, a Bluetooth port, an IP port, or a logical port associated with a wireless service, etc. Output device(s) 1640 use some of the same type of ports as input device(s) 1636.

Thus, for example, a universal serial bus port can be used to provide input to computer 1612 and to output information from computer 1612 to an output device 1640. Output adapter 1642 is provided to illustrate that there are some output devices 1640 like monitors, speakers, and printers, among other output devices 1640, which use special adapters. Output adapters 1642 comprise, by way of illustration and not limitation, video and sound cards that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1612. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1646 is illustrated with remote computer(s) 1644. Remote computer(s) 1644 is logically connected to computer 1612 through a network interface 1648 and then physically connected by way of communication connection 1650. Network interface 1648 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   determining different modulation indexes for a code rate of a data transmission to be sent to the device by network equipment in accordance with using a multiple-input and multiple-output communication protocol with a group of layers;
   generating a first pair comprising the code rate and a first modulation index of the different modulation indexes;
   generating a second pair comprising the code rate and a second modulation index of the different modulation indexes;
   mapping the first pair to a first layer of the group of layers based on signal interference values associated with respective layers of the group of layers;
   mapping the second pair to a second layer of the group of layers based on the signal interference values;
   sending recommendation information to the network equipment identifying the different modulation indexes for the code rate, the first pair, the second pair, the first layer to which the first pair is mapped, and the second layer to which the second pair is mapped; and
   based on the sending, receiving the data transmission from the network equipment in accordance with a scheduling configuration determined based on the recommendation information.

2. The device of claim 1, wherein the sending comprises sending the recommendation information in association with reporting channel state information to the network equipment.

3. The device of claim 1, wherein the signal interference values comprise a first signal-to-noise plus interference ratio associated with the first layer, and wherein mapping the first pair comprises mapping based on the first signal-to-noise plus interference ratio.

4. The device of claim 1, wherein the signal interference values comprise a second signal-to-noise plus interference ratio associated with the second layer, and wherein mapping the second pair comprises mapping based on the second signal-to-noise plus interference ratio.

5. The device of claim 1, wherein the operations further comprise:
   determining signal-to-noise plus interference ratios associated with the group of layers; and
   determining the first modulation index and the second modulation index based on the signal-to-noise plus interference ratios.

6. The device of claim 1, wherein the operations further comprise, responsive to the sending:
   receiving control information from the network equipment via a downlink control channel identifying a scheduling configuration determined for the data transmission based on the recommendation information; and
   employing the control information to decode the data transmission.

7. The device of claim 3, wherein determining the different modulation indexes comprises determining the first modulation index based on the first signal-to-noise plus interference ratio.

8. The device of claim 4, wherein determining the different modulation indexes comprises determining the second modulation index based on the second signal-to-noise plus interference ratio.

9. The device of claim 1, wherein the operations further comprise:
   determining a lowest signal-to-noise plus interference ratio associated with the group of layers; and
   determining the first modulation index based on the lowest signal-to-noise plus interference ratio.

10. The device of claim 9, wherein mapping the first pair comprises mapping the first pair to the first layer based on the first layer being associated with the lowest signal-to-noise plus interference ratio.

11. The device of claim 9, wherein mapping the second pair comprises mapping the second pair to the second layer based on the second layer being associated with a higher signal-to-noise plus interference ratio relative to the lowest signal-to-noise plus interference ratio.

12. A method, comprising:
    determining, by a device comprising a processor, different modulation indexes for a code rate of a data transmission to be sent to the device by network equipment using a group of layers in accordance with using a multiple-input and multiple-output communication protocol;
    determining, by the device, a first pair comprising the code rate and a first modulation index of the different modulation indexes;
    determining, by the device, a second pair comprising the code rate and a second modulation index of the different modulation indexes;
    mapping, by the device, the first pair to a first layer of the group of layers based on signal interference values associated with respective layers of the group of layers;
    mapping, by the device, the second pair to a second layer of the group of layers based on the signal interference values;
    sending, by the device, recommendation information to the network equipment identifying the different modulation indexes for the code rate, the first pair, the second pair, the first layer to which the first pair is mapped, and the second layer to which the second pair is mapped; and
    based on sending, receiving, by the device, the data transmission from the network equipment in accordance with a scheduling configuration determined based on the recommendation information.

13. The method of claim 12, wherein determining the different modulation indexes comprises determining the first modulation index based on a first signal-to-noise plus interference ratio associated with the first layer, and wherein mapping the first pair comprises mapping the first pair to the first layer based on the first signal-to-noise plus interference ratio being associated with the first layer.

14. The method of claim 12, wherein determining the different modulation indexes comprises determining the second modulation index based on a second signal-to-noise plus interference ratio associated with the second layer, and wherein mapping the second pair comprises mapping the second pair to the second layer based on the second signal-to-noise plus interference ratio being associated with the second layer.

15. The method of claim 12, further comprising:
   determining, by the device, signal-to-noise plus interference ratios associated with the group of layers; and
   determining, by the device, the first modulation index and the second modulation index based on the signal-to-noise plus interference ratios.

16. The method of claim 12, further comprising:
   determining, by the device, a lowest signal-to-noise plus interference ratio associated with the group of layers; and
   determining the first modulation index based on the lowest signal-to-noise plus interference ratio, wherein mapping the first pair comprises mapping the first pair to the first layer based on the first layer being associated with the lowest signal-to-noise plus interference ratio, and wherein mapping the second pair comprises mapping the second pair to the second layer based on the second layer being associated with a higher signal-to-noise plus interference ratio relative to the lowest signal-to-noise plus interference ratio.

17. A non-transitory machine-readable medium, comprising executable instructions that, when executed by a processor of a device, facilitate performance of operations, comprising:
   determining different modulation indexes for a code rate of a data transmission to be sent to the device by network equipment using layers in accordance with using a multiple-input and multiple-output communication protocol;
   determining a first pair comprising the code rate and a first modulation index of the different modulation indexes;
   determining a second pair comprising the code rate and a second modulation index of the different modulation indexes;
   mapping the first pair to a first layer of the layers based on signal interference values associated with respective layers of the layers;
   mapping the second pair to a second layer of the layers based on the signal interference values;
   sending recommendation information to the network equipment identifying the different modulation indexes for the code rate, the first pair, the second pair, the first layer to which the first pair is mapped, and the second layer to which the second pair is mapped; and
   based on sending, receiving the data transmission from the network equipment in accordance with a scheduling configuration determined based on the recommendation information.

18. The non-transitory machine-readable medium of claim 17, wherein determining the different modulation indexes comprises determining the first modulation index based on a first signal-to-noise plus interference ratio associated with the first layer, and wherein mapping the first pair comprises mapping the first pair to the first layer based on the first signal-to-noise plus interference ratio being associated with the first layer.

19. The non-transitory machine-readable medium of claim 17, wherein determining the different modulation indexes comprises determining the second modulation index based on a second signal-to-noise plus interference ratio associated with the second layer, and wherein mapping the second pair comprises mapping the second pair to the second layer based on the second signal-to-noise plus interference ratio being associated with the second layer.

20. The non-transitory machine-readable medium of claim 17, wherein the operations further comprise:
   determining signal-to-noise plus interference ratios associated with the group of layers; and
   determining the first modulation index and the second modulation index based on the signal-to-noise plus interference ratios.

* * * * *